United States Patent
Wong et al.

[11] Patent Number: 5,890,169
[45] Date of Patent: Mar. 30, 1999

[54] DISK FRAGMENTATION REDUCTION USING FILE ALLOCATION TABLES

[75] Inventors: Thomas K. Wong, Pleasanton; Peter W. Madany, Fremont, both of Calif.

[73] Assignee: Sun Microsystems, Inc., Palo Alto, Calif.

[21] Appl. No.: 107,637

[22] Filed: Jun. 30, 1998

Related U.S. Application Data

[63] Continuation of Ser. No. 743,231, Nov. 5, 1996, which is a continuation-in-part of Ser. No. 669,632, Jun. 24, 1996.

[51] Int. Cl.$^6$ .................................................. G06F 17/30
[52] U.S. Cl. .................... 707/206; 707/101; 364/715.02; 341/59
[58] Field of Search ............................ 707/101; 341/206, 341/59; 364/715.02

[56] References Cited

U.S. PATENT DOCUMENTS

| | | | |
|---|---|---|---|
| 5,212,786 | 5/1993 | Sathi | 707/101 |
| 5,734,340 | 3/1998 | Kennedy et al. | 341/59 |
| 5,774,715 | 7/1998 | Madany et al. | 364/715.02 |

*Primary Examiner*—Thomas G. Black
*Assistant Examiner*—Charles L. Rones
*Attorney, Agent, or Firm*—Beyer & Weaver, LLP

[57] ABSTRACT

A combined file allocation table file system (CFAT file system) uses two or more FAT file systems with different cluster sizes to form a single user visible FAT file system to reduce disk fragmentation. The FAT file system having the largest cluster size is used to store all of the other small FAT file systems as files with holes. The clusters of the small FAT file systems thus do not occupy disk space until they are allocated. Files containing user data are stored in one or many of the large and small FAT file systems to achieve optimal storage. More clusters are available for storing files with sizes that are smaller than the size of one large cluster. A CFAT file system includes: a large file allocation table for large clusters, a file allocation table extension to provide holes within the CFAT file system, and any number of small file allocation tables providing a variety of small cluster sizes. A file is stored in clusters as large as possible except for the last cluster which is stored in only as large a cluster size as is needed. Other allocation strategies are possible. The Small FAT file systems are contained within regular files of the Large FAT file system.

36 Claims, 20 Drawing Sheets

FILE ALLOCATION TABLE (FAT)

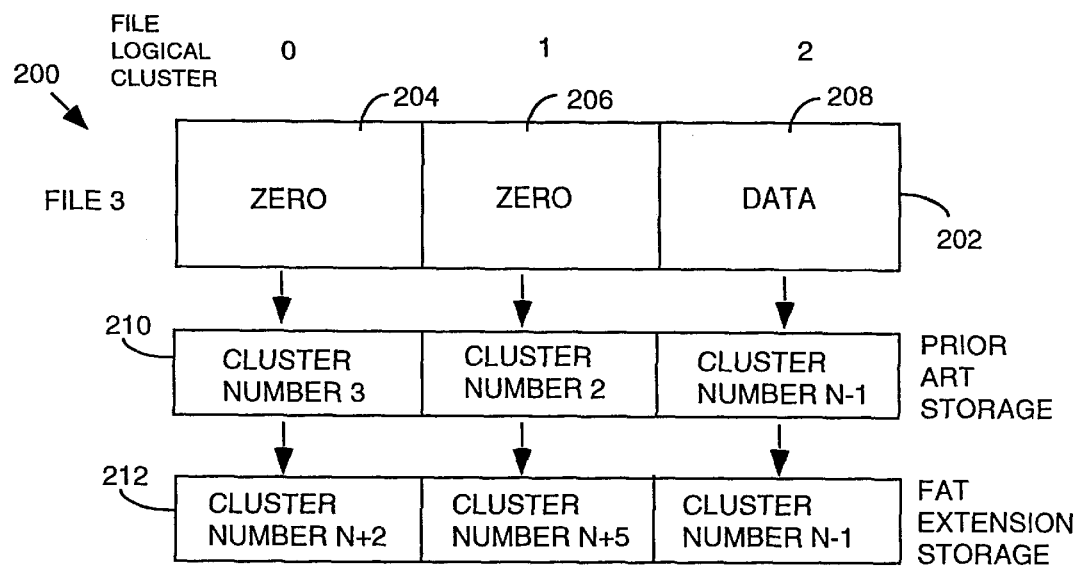
Figure 3
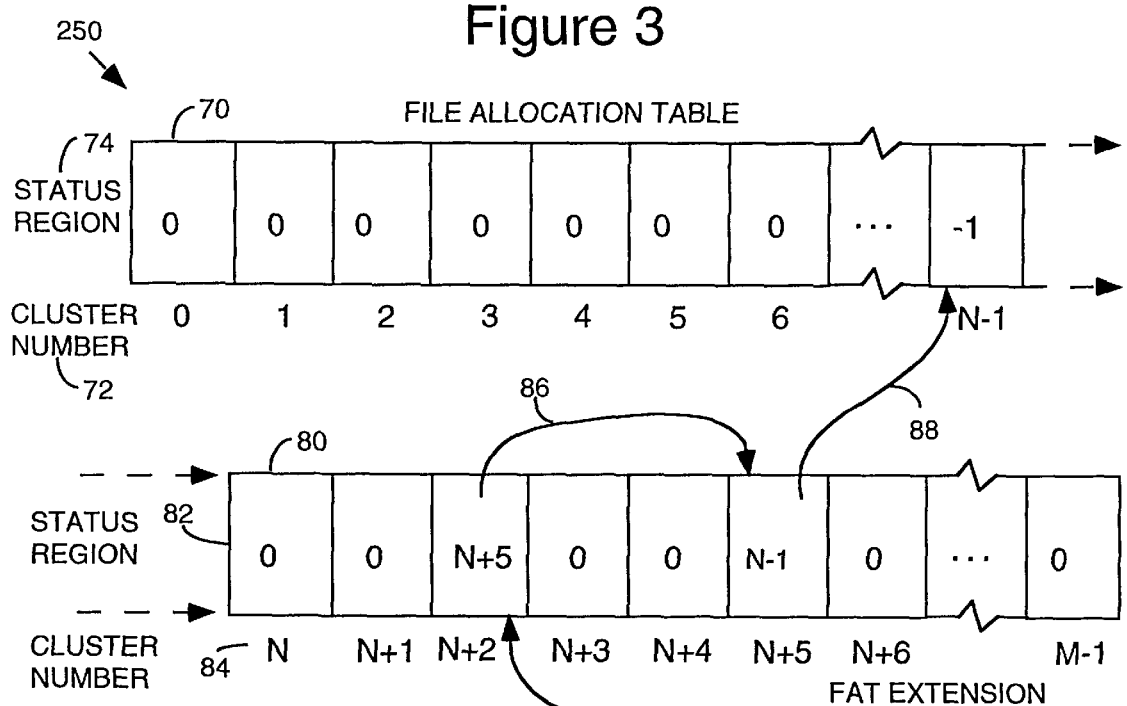
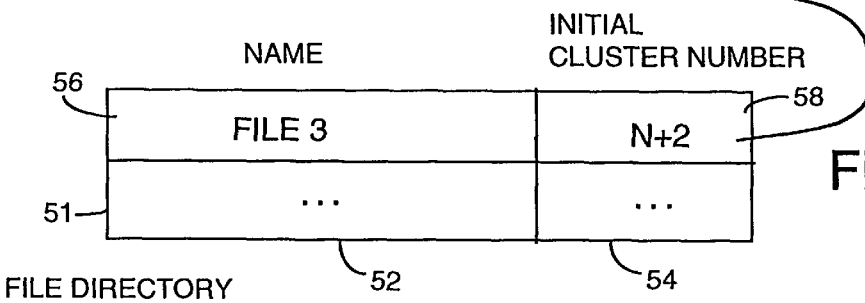
Figure 4

400

| FILE SYSTEM | TOTAL NUMBER OF CLUSTERS IN FAT | LOCATION OF FILE ALLOCATION TABLE | CLUSTER SIZE |
|---|---|---|---|
| LARGE FAT | N (0 to N-1) | CLUSTER NUMBER 0 | 64K |
| HOLE INDICATION | M (N to N+M-1) | LARGE FAT EXTENSION | 64K |
| SMALL FAT B | P (N+M to N+M+P-1) | FILE B | 32K |
| SMALL FAT C | X (N+M+P to N+M+P+X-1) | FILE C | 16K |
| ... | ... | ... | ... |

401  402  404  406
410

DIRECTORY OF FILE ALLOCATION TABLES

Figure 7

DISK FRAGMENTATION REDUCTION USING FILE ALLOCATION TABLES

CROSS-REFERENCE TO RELATED APPLICATIONS

This application is a continuation of U.S. patent application Ser. No. 08/743,231 (allowed), filed Nov. 5, 1996, which in turn is a continuation-in-part of U.S. patent application Ser. No. 08/669,632 (allowed), filed Jun. 24, 1996, each naming T. Wong and P. Madany as inventors and assigned to the assignee of the present application; each is incorporated herein by reference.

FIELD OF THE INVENTION

The present invention relates generally to file system management in a computing system. More specifically, the present invention relates to reducing disk fragmentation in a file system through the use of file allocation tables.

BACKGROUND OF THE INVENTION

File system services provided by the operating system of a computing system are responsible for managing the allocation of space of storage media. These file system services also provide a logical framework to the users of the computer for accessing data stored in the storage media. The logical framework usually includes a hierarchy of directory structures to locate a collection of files that contain user-named programs or data. The use of directories and files relieves the users from having to find the actual physical location of the stored information in a storage medium. Many different types of file systems are known. By way of example, popular file systems include various UNIX™ based file systems and the WINDOWS NT™ file system. One UNIX™ file system that incorporates the concept of "holes" (discussed below) is described in "The Design and Implementation of the 4.3BSD UNIX™ Operating System", S. Leffler, M. McKusick, M. Karels and J. Quarterman, chapter 7, Addison-Wesley, 1989. The WINDOWS NT™ file system is described in "Inside the Windows NT™ File System", H. Custer, Microsoft Press, 1994.

A typical file system implementation, hereafter referred to as a file system, converts from the user abstraction of a file as an array of bytes to the structure imposed by the underlying physical medium of the storage medium. Typically, magnetic disks are organized into fixed size sectors. Although the user may wish to write a single byte to a file, the disk may read or write only in multiples of sectors. Thus, in order to modify a single byte in a file, the file system must first read in the sector containing the byte to be modified, then replace the affected byte, and finally write the sector back to the disk. This operation of converting a user's random access to an array of bytes into reads and writes of disk sectors is known as block input/output or "Block I/O."

To effectively support Block I/O, a file system typically divides the array of bytes in a file into a set of fixed size clusters. A cluster may be defined as the minimum size that may be allocated for a disk. For example, if a file system's cluster size is 8192 bytes, then the first cluster allocated to a file would contain bytes 0 to 8191 of the file, and the next cluster of the file would contain bytes 8192 to 16383, etc. These clusters of a file are then stored to a disk in units of a cluster as well. The file system also divides the sectors of a disk into a set of fixed size clusters. The size of each cluster is called the cluster size. Each cluster of a disk is assigned a unique address, called a cluster number. Cluster numbers are assigned consecutively, starting from 0. If a disk has N clusters, then cluster number N−1 is the last cluster of the disk. If each cluster of a disk contains 8 sectors, then cluster number 0 corresponds to sectors numbered 0 to 7 on the disk, and cluster number 1 corresponds to sectors numbered 8 to 15 of the disk, etc. Thus, the conceptual notion of a cluster within a file is eventually written to disk at a particular cluster that has a unique cluster number.

Physical storage 10 containing clusters divided up into sectors is shown in FIG. 1. Shown is the linear physical address space of a disk (for example). The disk contains sectors of data that are organized into clusters. These clusters are shown symbolically as being linear, however, a disk controller would be responsible for allocating an individual cluster to a particular region of the disk. Shown in particular is a disk having at 12 a cluster 0 up through at 14 a cluster N−1. The disk contains N clusters. Each cluster may contain eight sectors, for example. For example, cluster 0 would correspond to sectors 0–7, cluster 1 would correspond to sectors 8–15, etc. A total of X sectors may be present on the disk. It should be appreciated that this disk as mass storage in a computer may take a variety of forms. The disk may be any type of hard disk that uses magnetic media, a floppy disk, or the like. Also the disk may be any other type of physical storage in a computer such as an optical disk, RAM, or the like.

Because a file system or disk controller in a computing system may write data to these clusters continuously or randomly, it is important to keep track of which clusters on the disk contain data, i.e. which clusters are allocated. It is also important to keep track of which clusters contain data for a given file. One method to keep track of such information is through the use of a File Allocation Table (FAT).

A particular file system implementation uses a file allocation table (FAT) to manage the allocation of clusters of a disk. These file system implementations that use a file allocation table are hereafter referred to as FAT file systems. The MSDOS, OS/2, Window 3.1 FAT and the Window 95 VFAT file systems are examples of FAT file systems that are available commercially. A FAT file system will now be described generally, and then an example is provided below with reference to FIG. 2.

Typically, a FAT file system uses one file allocation table (FAT) for each disk under its control. Each entry in a FAT for a disk is associated with (or maps to) a cluster of the disk. The first FAT entry is associated with the first cluster of the disk. The next FAT entry is associated with the next cluster of the disk, and so on. If a disk has N Clusters, then the FAT for the disk has N entries, and the last FAT entry is associated with the last cluster of the disk. In other words, it can be said that the cluster number for each cluster on the disk is used as an index into the FAT to access the FAT entry for that particular cluster on the disk.

The contents of each FAT entry for a particular cluster on the disk is itself a cluster number (representing another physical cluster on the disk) and this FAT entry is used to indicate: (1) whether the particular cluster (associated with the FAT entry) has been allocated or not (the special cluster number 0 is typically used to represent an unallocated cluster); (2) whether this cluster is the last (or only) cluster in a file (the last cluster of a file is usually represented by an invalid cluster number such as "−1" in the FAT entry for that particular cluster); and (3) the next cluster of the file. In other words, for a particular cluster of a file that is stored on disk, its cluster number (where it is stored on disk) serves as an index to the FAT, and the value stored at this FAT entry is another cluster number representing where the next cluster of the file is stored on the disk.

A file in a FAT file system having Z clusters uses Z entries in the FAT. One of the directories in a FAT file system contains a directory entry for a given file that identifies the cluster number of the first cluster of that file. And the FAT entry that corresponds to the cluster number of the first cluster of a file identifies the cluster number of the second cluster of the file, and so on. In this fashion, the FAT entries corresponding to the cluster numbers on disk for the clusters of a file form a linked list. The FAT entry for the last cluster of a file contains an invalid cluster number such as "−1", to indicate that this cluster is the last cluster of the file. The minimum space allocation unit in a FAT file system is one cluster. Since the clusters of a file may not necessarily be allocated consecutively, each read or write operation usually requires one I/O operation.

FIG. 2 shows one implementation of a file system 50 in which a file directory 51 is able to access a file allocation table 70 in order to keep track of the status of the clusters on the disk. The file directory 51 may represent a complex hierarchy of directories within a file system as will be appreciated by those of skill in the art. The file directory 51 contains a File Name field 52 and an Initial Cluster Number field 54. The File Name field lists files within the file system and the Initial Cluster Number field indicates by cluster number the first cluster on disk that is used by that file to store its data.

The structure of the file allocation table 70 will now be described. A file allocation table (FAT) may be implemented using a wide variety of data structures. It is preferable to implement a file allocation table 70 using an array in which the index of the array represents a cluster on the disk and the data at the location in the array according to the index represents the status of that cluster. In other words, the cluster number serves as an index into the FAT to access a corresponding element of the array that indicates the status of the cluster on the disk identified by its cluster number. For example, the FAT 70 is shown as having an index Cluster Number 72 that ranges from 0 to N−1. The elements of the array are a status region 74 that will indicate not only the status of a particular cluster on the disk, but also the location of the next cluster within a file. A wide variety of status information for a particular cluster may be contained within the status region 74. By way of example, it is possible to keep track of whether a cluster has been allocated or not, whether it is the last cluster within a file, etc.

For example, the FAT 70 operates to indicate the status of all of the clusters of the disk 10 shown in FIG. 1. For example, in determining the status of cluster 1, one may refer to the FAT 70. To determine the status of cluster 1, an index of 1 is used as a cluster number to gain access to the status region 76 for that cluster. As shown at 76, the status of cluster 1 is represented by a 0, indicating that this cluster is currently unallocated. A positive number of 1 or greater may indicate that the cluster is currently allocated to a particular file. Also a status of "−1" for a particular cluster may indicate that this cluster is the last cluster containing data for a particular file. It should be appreciated that other numerical conventions may be used to represent the status of a cluster.

The use of the FAT 70 with the file directory 51 will now be described. Within the file directory 51 is a File1 56 that has an Initial Cluster Number of 3. This indicates that the first cluster of data for File1 is stored in cluster 3 on the disk. This Initial Cluster Number of 3 also serves as a pointer 58 to the FAT 70. This pointer 58 points to the status region as identified by the index 3 that represents the status of cluster number 3. The status region for the index 3 is the number 2 that indicates not only that this cluster 3 has been allocated but also that the next cluster containing data for this file is cluster 2. This number 2 also serves as a pointer 78 to the status region of the FAT as indexed by cluster number 2. Contained within this status region for the cluster number 2 is the quantity N−1 that indicates not only that cluster 2 has been allocated but also that the next cluster that contains data for this file is located at cluster N−1. This quantity N−1 also serves as a pointer 80 to the status region of the FAT as indexed by the quantity N−1. Contained within this region is the quantity "−1" that indicates not only that cluster N−1 has been allocated to this file, but also that this cluster N−1 is the last cluster containing data for this file.

The File2 is represented in a similar manner. Within the file directory 51 is a File2 60 that has an Initial Cluster Number of 5. This indicates that a first cluster of data for File2 is stored in cluster 5 on the disk. This Initial Cluster Number of 5 also serves as a pointer 62 to the FAT 70. This pointer 62 points to the status region as identified by the index 5 that represents the status of cluster number 5. The status region for the index 5 is the number "−1" that indicates not only that this cluster 5 has been allocated but also that this cluster 5 is the last cluster containing data for this File2. Of course, other files within the file system may be represented in the file directory and the FAT. Files that are empty may be indicated by storing a "0" in the file directory at the Initial Cluster Number.

While most applications write data to a file sequentially, some applications write data randomly to any offset in the file. For example, an application may create a new file and then write several bytes starting at an offset T within the file. In this case, bytes between offset 0 and offset T−1 of the file will have never been written, but they are logically part of the file and are generally treated as if they all have the value zero. Also, the use of a hashing function in a database may result in clusters of a file containing nothing but zeros. In a FAT file system, clusters of a file that are completely zero are still treated as containing data; a cluster will be allocated on disk and a cluster full of zeros will be written to disk.

Since it is wasteful to store a physical cluster for a corresponding logical cluster of a file that has never been written (i.e. full of zeros), one technique employed by some file systems such as most UNIX™ based file systems is to avoid the actual allocation in mass storage for such a zero cluster. The file system designates a special physical cluster address, usually "0", that represents the address of a special, but non-existent, physical cluster that is full of zeros. This special physical cluster is commonly called a "hole." Prior art FAT file system implementations have typically had no such capabilities for representing holes. However, U.S. patent application entitled "File Allocation Tables with Holes" by inventors Thomas K. Wong and Peter Madany, Ser. No. 08/669,632 (allowed), filed Jun. 24, 1996, does describe a technique for representing holes within a file system that uses a file allocation table. The use of holes with a FAT file system avoids allocation of physical storage when it is not needed.

Wong, et. al, extends a FAT file system to support the use of files with "holes". It also uses this concept of "holes" within a FAT file system to support file system level compression. In this way, both compressed and expanded files in a FAT file system may coexist. Also, new disks may be configured with additional FAT entries to support compression.

Typically, a disk with N clusters in a FAT file system will have a file allocation table (FAT) that contains N entries, representing the clusters of the disk numbered 0 to N−1. Wong, et. al, provides a file allocation table extension (FAT extension) that allows for additional entries numbered from N to M−1. Thus, a total of M entries are available in the FAT and FAT extension. For example, if a disk has 10 clusters, and a FAT extension has entries, the entries in the FAT will be numbered from 0 to 9, and the FAT extension entries will be numbered from 10 to 14 for a total of M=15 entries. This FAT extension represents those clusters that are all zeros within the file system and as such provides for a way to keep track of such clusters without having to write them to disk. Thus, for a cluster that is all zeros, this cluster is not written to disk but is assigned a cluster number of N or greater. Thus, any cluster of a file with a cluster number greater than or equal to N is non-existent and is treated as if it were a cluster that is full of zeros. This representation of a zero cluster in the FAT extension is called a "hole".

It should be appreciated that clusters other than those full of zeros may be treated as "holes." For example, the convention used may be that clusters that contain all "1's" are considered as being blank and that such clusters should not be stored to disk but should be represented as a "hole". Also, a cluster that contains a uniform pattern of bits may be considered as not appropriate for writing to disk and may be represented as a "hole." Any type of data pattern represented in a cluster that need not be written to disk may be represented as a "hole."

Referring now to FIGS. 3 and 4, an embodiment of the technique described in Wong, et. al is illustrated in which an extension of a FAT is used to represent the concept of "holes" within a particular file. FIG. 3 shows at 200 a particular File3 and symbolically where its data may be stored on the disk. For example, File3 202 contains three logical clusters of data 204, 206 and 208. Relative to File3 only, these three clusters of data may be referred to as file logical clusters 0, 1 and 2. The clusters 204 and 206 each contain all zeros whereas the cluster 208 contains actual data. In previous implementations of a prior art FAT as shown in FIG. 2, cluster 204 is stored at cluster 3 on the disk, cluster 206 is stored at cluster 2 on the disk, and cluster 208 is stored at cluster N−1 on the disk. This storage of the data of File3 on the disk is shown symbolically at 210. As can be appreciated, if clusters 204 and 206 contain nothing but zeros, it is wasteful to store complete clusters full of zeros on the disk. Accordingly, an extension of a FAT may be used to represent these zero clusters and to avoid the allocation of physical clusters on disk for zero clusters. This representation 212 will be explained below with reference to FIG. 4.

FIG. 4 shows at 250 a traditional FAT 70 enhanced by a FAT extension 80 that is used in conjunction with a file directory 51. The use of this FAT extension 80 will be discussed with reference to the representation of the storage of File3 of FIG. 3. As discussed above, a FAT 70 is represented as an array in which the index of the array is a cluster number 72 that corresponds to a physical cluster on the disk, and the data stored at the element corresponding to the index represents the status of that particular cluster whose number is indicated by the index.

A FAT extension 80 may also be represented by an array that also has as an index a cluster number 84 and a status region 82. It may be possible to implement this FAT extension 80 using a wide variety of equivalent data structures. As the FAT extension 80 is an extension of the FAT 70 its index begins with cluster number N up to a cluster number M−1. As the disk of the computing system still only contains N physical clusters, the index cluster number 84 of the FAT extension 80 that ranges from N to M−1 does not correspond to physical clusters on the disk. As such, an index into the FAT extension 80 may be used to represent that a cluster of a file contains all zeros instead of allocating an actual physical cluster.

In this example, File3 has logical clusters 0 and 1 of all zeros and a logical cluster 2 that does contain data. In the prior art, these first two clusters of File3 that contain zeros are allocated to actual physical clusters on the disk. However, by using the FAT extension 80, these first two clusters of File3 that contain zeros may be represented by using entries within the FAT extension 80 instead of allocating an actual physical cluster on the disk. Shown is a file directory 51 that has within it a File3 56 that has an Initial Cluster Number of N+2. This reference N+2 serves as a pointer 58 to an entry within the FAT extension 80 indexed by the cluster number N+2. Because this initial cluster for the File3 is located at the cluster number N+2 this indicates that this initial cluster is full of zeros. At the cluster number N+2 is the quantity N+5. The quantity N+5 at this location indicates the next cluster for File3 is also represented within the FAT extension 80 at the cluster number N+5. The quantity N+5 serves as a pointer 86 to the entry located at cluster number N+5. Because this second cluster is represented at the cluster number N+5, this means that this second cluster is also completely full of zeros. Within the FAT extension 80 at the cluster number N+5 is the quantity N−1. The quantity N−1 also serves as a pointer 88 back to the FAT 70 to the entry index by the cluster number N−1. Because this third cluster of File3 is indexed by the cluster number N−1 this means that the third cluster does actually contain data and is stored at cluster N−1 on the disk. And because the FAT 70 at cluster number N−1 contains the status of "−1", this means that this third cluster is the last cluster containing data for this file.

Thus, it can be seen that physical clusters for File3 with a cluster number greater than or equal to N contain only zeros and are not represented on disk, whereas physical clusters with a cluster number of N−1 or less contain data and have allocated disk space. This representation is shown symbolically at 212 in FIG. 3. It should also be appreciated that the clusters on the physical disk that contain data for a particular file as well as the zero clusters may be found by searching from the file directory through a form of a linked list until the quantity "−1" is reached. In this fashion, a conceptual array for the File3 may be created that keeps track of where each logical cluster of File3 is represented.

However, other challenges exist for users of a FAT file system aside from the representation of holes. One major problem facing users of a FAT file system is to assign the cluster size for the FAT file system when the FAT file system is first formatted. Once set, the cluster size of a FAT file system cannot be changed easily. To change the cluster size, all the data from the disk must be first copied to a temporary storage location. Next, the disk must be reformatted with the new cluster size, and finally all of the data from the disk in temporary storage must be recopied back onto the disk. This is a time consuming and possibly error-prone procedure that most users are not willing to perform. Thus, it is important for an optimal cluster size to be chosen initially.

If the cluster size of a FAT file system is set too small, then more clusters will be needed to store the data of a file. If the file is not contiguous on disk (which is common), then each cluster must be read or written individually. Thus, small cluster size degrades the file system read/write performance since more disk I/Os are needed to read or write the data of a file. On the other hand, a cluster size for a FAT file system that is set too large may also cause problems. Since the number of clusters available on a disk depends on the cluster size, a larger cluster size will result in a smaller number of clusters available on a disk. Because each non-empty file needs at least one cluster, a larger cluster size results in a smaller number of files that can be stored on a disk. Also, if the cluster size is set too large, there may not be enough file data to fill up all the sectors in a cluster for that file. Sectors that constitute a cluster of a file that are not needed to store the data of the file cannot be used to store data from other files, resulting in many unused sectors on a disk. This is commonly known as a disk fragmentation problem.

Thus, it is desirable to create a FAT file system with a large cluster size in order to maximize I/O performance. It is also desirable to create a FAT file system with a relatively small cluster size in order to increase the number of available clusters in a FAT file system so that more files can be stored in a FAT file system. At the same time, it would be desirable to reduce the disk fragmentation in a FAT file system in order to have efficient usage of storage space.

SUMMARY OF THE INVENTION

An embodiment of the present invention uses two or more FAT file systems with different cluster sizes and combines them to form a single user visible FAT file system to reduce disk fragmentation. The constituent FAT file system of the combined file system having the largest cluster size is used to store all of the remaining constituent FAT file systems as files with holes. The clusters of the remaining constituent FAT file systems do not occupy disk space until they are allocated. Files containing user data are stored in one of the constituent FAT file systems to achieve maximal storage usage. More clusters are available for storing files with sizes that are smaller than the size of one large cluster.

In one aspect of the invention, a combined file allocation table file system (CFAT file system) is arranged to store files to mass storage. The CFAT system includes: a large file allocation table arranged to indicate the status of large clusters within mass storage for a Large FAT file system, a file allocation table extension to indicate holes within the CFAT file system, and a small file allocation table to indicate the status of small clusters for a Small FAT file system. Preferably, the small clusters and large clusters have different sizes. Thus, a non-empty file may be stored in mass storage efficiently by utilizing at least one of the large clusters, at least one of the small clusters, or a combination of both. Preferably, the Small FAT file system is contained within a regular file of the Large FAT file system. Any number of additional Small FAT file systems may be added in order to have different small cluster sizes.

Another aspect of the invention relates to a file allocation table (FAT) directory for assisting in the implementation of a CFAT file system. The FAT directory includes: a large cluster range indicator to indicate the number of large clusters available within the Large FAT file system, a hole range indicator to indicate the number of holes available within a FAT extension, a small cluster range indicator to indicate the number of small clusters available within a Small FAT file system, and a small system location indicator to indicate the location within the CFAT file system of the Small FAT file system. The small system location indicator is associated with the small cluster range indicator in the FAT directory so that a small file system may be found given a cluster number. The FAT directory may also contain a cluster size for each file system. The FAT directory may also include references to other Small FAT file systems.

An embodiment of the invention for writing to storage stores clusters as large as possible for a file until the last cluster is reached. Then, it is determined whether the last cluster will optimally fit within a smaller cluster of one of any number of Small FAT file systems. The last cluster is written to a smaller cluster of a Small FAT file system if available. An embodiment of a read operation compares the cluster number of a cluster to read with the available file systems. A cluster from the Large FAT file system is read directly, while a cluster from a Small FAT file system is read from the file that contains that file system.

BRIEF DESCRIPTION OF THE DRAWINGS

The invention, together with further advantages thereof, may best be understood by reference to the following description taken in conjunction with the accompanying drawings in which:

FIG. 3 illustrates symbolically various types of data within a file and how that data may be represented in a prior art FAT and using a FAT extension.

FIG. 4 illustrates a file allocation table and a file allocation table extension within a file system.

FIG. 7 illustrates a directory of file allocation tables used in one embodiment of the present invention.

FIG. 11b is a flow chart representing the compute write size step 705 used in one embodiment of the write operation of FIG. 11a.

FIG. 11d is a flow chart representing the compute and set file size step 719 used in one embodiment of the write operation of FIG. 11a.

FIG. 12b is a flow chart representing the compute read size step 1012 used in one embodiment of the read operation of FIG. 12a.

FIG. 12c is a flow chart representing the read cluster step 1014 used in one embodiment of the read operation of FIG. 12a.

FIG. 14b is a flow chart representing the truncate file step 1105 used in one embodiment of the set file size operation of FIG. 14a.

FIG. 14c is a flow chart representing the lengthen file step 1107 used in one embodiment of the set file size operation of FIG. 14a.

DETAILED DESCRIPTION OF THE INVENTION

Figure 1:
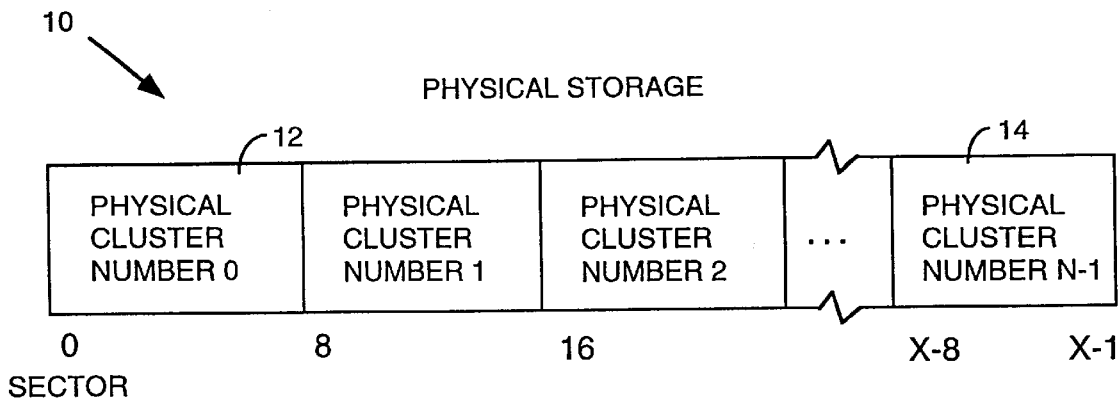
FIG. 1 illustrates symbolically the physical address space of physical storage within a computing system.
Figure 2:
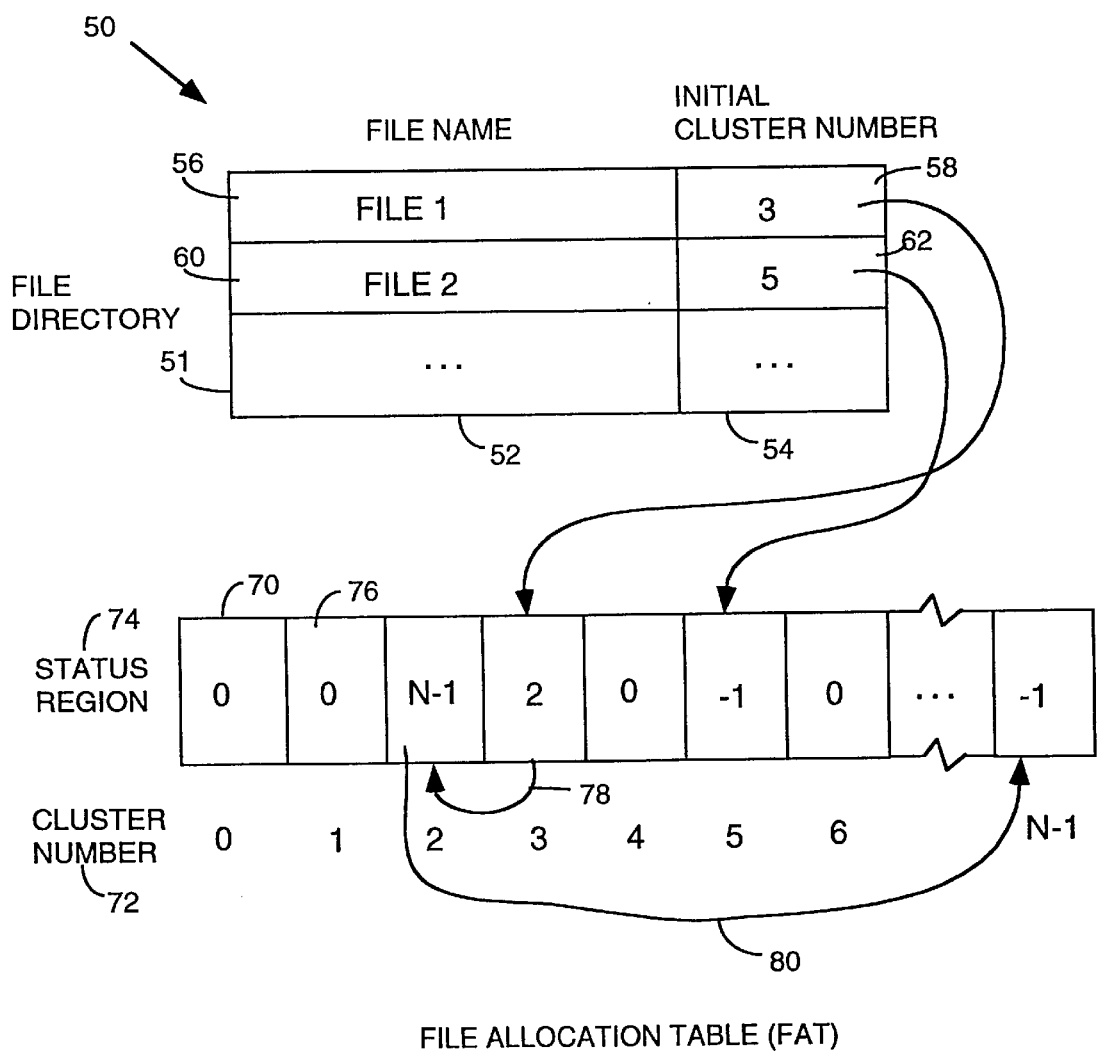
FIG. 2 illustrates the use of a prior art file allocation table (FAT) within a file system.

The present invention provides a technique for reducing disk fragmentation in a FAT file system. In one embodiment, the present invention allows for relatively large cluster sizes, while at the same time increasing the number of clusters in the FAT file system. The present invention combines at least two, but perhaps more, FAT file systems, thus providing different cluster sizes for the overall file system. These FAT file systems are combined to form one single FAT file system, or a Combined FAT file system (CFAT file system).

By convention in the CFAT file system, the file system having the largest cluster size is referred to as the Large FAT file system, and the remaining FAT file systems are referred to as the Small FAT file systems. Also by convention, the cluster size of the CFAT file system is the cluster size of the Large FAT file system. The total number of clusters available in the CFAT file system is the sum of the available clusters in each of the constituent FAT file systems. Thus, by providing a large FAT file system, and any number of file systems having smaller cluster sizes, the present invention is able to provide large clusters for more efficient I/O, and a greater number of smaller clusters for more file capacity. The greater number of smaller clusters available also help to prevent disk fragmentation. Preferably, the cluster sizes for the Small FAT file systems are ½, ¼, ⅛, etc. the size of the large cluster of the Large FAT file system, depending upon the umber of Small FAT file systems used.

Since a CFAT file system provides more cluster numbers (the clusters of the large FAT plus the clusters available in all of the Small FATs), another advantage of the present invention is that more files having sizes that are less than the size of one large cluster may be stored in a CFAT file system. Typically, because each non-empty file must be allocated at least one cluster, a prior art file system with N clusters may only contain at most N non-empty files. The present invention allows a smaller file to be allocated a smaller cluster if that is all that is needed. For example, for a CFAT having a large cluster size of 64 k and a smaller cluster size of 32 k, two files each of 32 k in size would each be allocated one 32 k cluster, thus allowing two files to exist in one 64 k cluster. Prior art FAT file systems of 64 k cluster size would require each 32 k file to be allocated one 64 k cluster, thus reducing the space available for more files.

Also, another advantage of the present invention is that relatively little change in an existing FAT file system program code is needed to implement the invention. This is because the cluster size of the Large FAT file system is still maintained as the cluster size for the overall CFAT file system. Also, each of the smaller FAT file systems are implemented within a file of the Large FAT file system. These files containing a Small FAT file system are treated as regular files by the Large FAT file system, thus presenting a transparent implementation of a CFAT file system. Embodiments of Small FAT file systems within files of a Large FAT file system will be discussed below with reference to FIGS. 6, 7, 8, 9 and 10. An embodiment of a write operation is discussed below with reference to FIGS. 11a through 11f; an embodiment of a read operation is discussed in FIGS. 12a through 13, and a set file size operation is discussed in FIGS. 14a through 14c.

The present invention applies to a variety of different allocation strategies for storing clusters of a file within a Large FAT file system, or within one or more Small FAT file systems. For example, one strategy may be to use as many different Small FAT file systems as possible in order to maximize storage efficiency at the sake of increased complexity. Another strategy may prefer simplicity in which only the last cluster of a file is stored in a Small FAT file system. This strategy sacrifices optimal efficiency for a more simplistic algorithm. In general, a particular strategy may implement a tradeoff between efficiency versus complexity of implementation. In the embodiments described in the write operation of FIGS. 11a through 11f, the read operation of FIGS. 12a through 13, and the set file size operation of FIGS. 14a through 14c, the strategy is to use all large clusters from the Large FAT file system for file storage except for the last logical cluster which is stored in as small a cluster as possible in one of the Small FAT file systems. An improvement to this strategy would be to use compression to shrink a last cluster of a file that is too big to fit into a cluster of a Small FAT file system.

Figure 5:
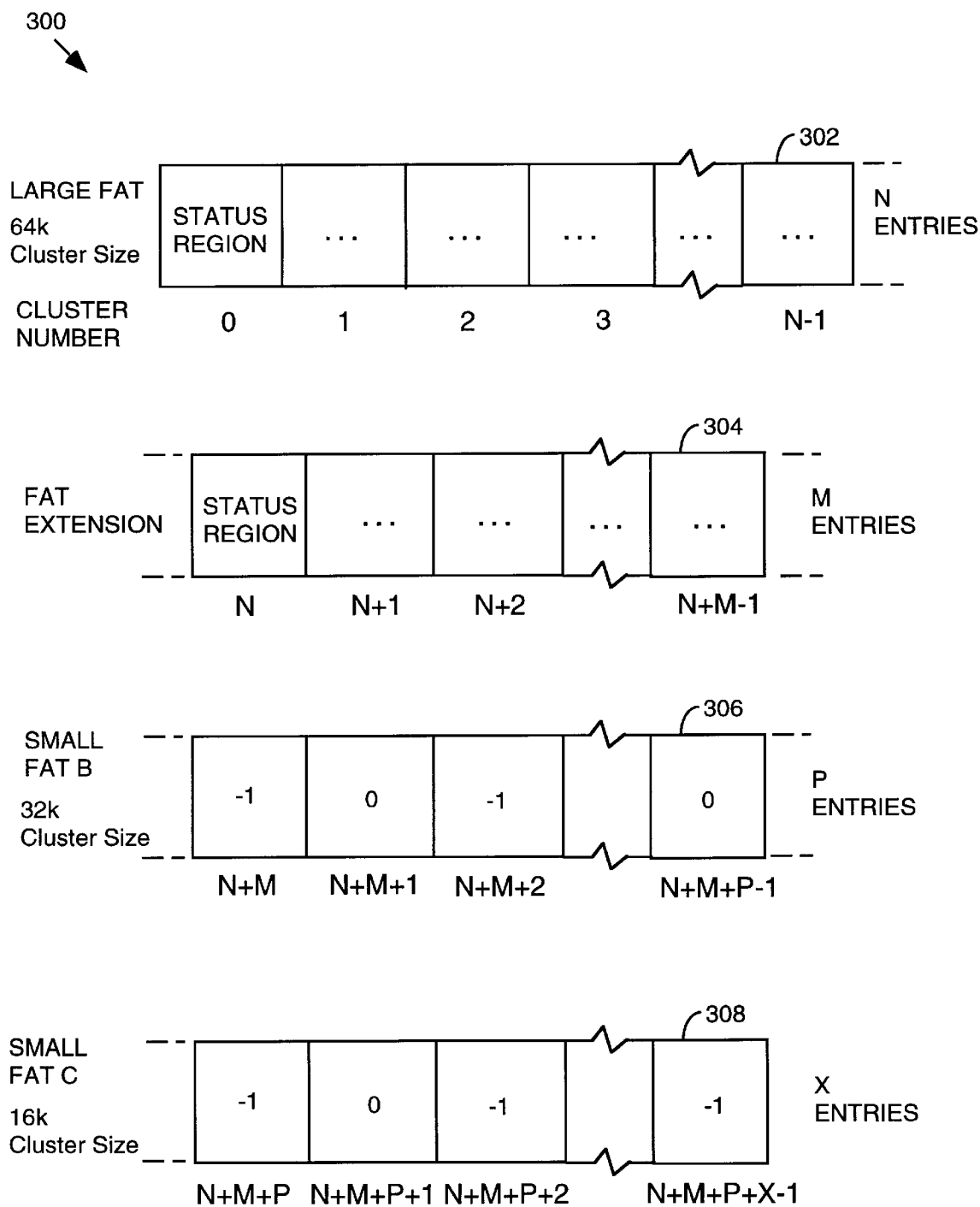
FIG. 5 illustrates symbolically a number of file allocation tables used in one embodiment of the present invention.

FIG. 5 illustrates a combined file allocation table file system (CFAT file system) 300 according to one embodiment of the present invention. FIG. 5 shows in a symbolic fashion how a CFAT file system incorporates a large FAT file system and any number of smaller FAT file systems. The CFAT file system 300 has a Large FAT 302, a FAT extension 304, a Small FAT B 306, and a Small FAT C 308. The Large FAT 302 represents the status of the physical clusters on disk, while each of the smaller FATs contains cluster numbers that do not necessarily represent a physical cluster on disk. The file allocation tables (FATs) may allocate space in any suitable cluster size. By way of example, the Large FAT allocates a cluster size of 64 k, the Small FAT B allocates a cluster size of 32 k, and the Small FAT C allocates a cluster size of 16 k. By providing different cluster sizes within one CFAT file system, files of all sizes are able to be stored and accessed efficiently.

In one embodiment of the invention, cluster numbers are assigned to each constituent FAT file system according to the cluster size of the constituent FAT file systems. By way of example, the first set of cluster numbers in the CFAT file system are assigned to the clusters in the Large FAT file system starting from cluster number 0. The next set of cluster numbers, starting with a cluster number that is one greater than the highest cluster number from the previous assigned set of cluster numbers is assigned to the clusters of the next constituent Small FAT file system having the second largest cluster size. This process continues until the last set of cluster numbers is assigned to the clusters of the Small FAT file system having the smallest cluster size. This use of cluster numbers may be illustrated by reference to the example CFAT system of FIG. 5.

As discussed above, the Large FAT assists in allocating the physical clusters of the disk to particular files. For a disk with a total of N clusters, the Large FAT has an array of N entries that are each indexed by cluster numbers ranging from 0 to N−1. Each entry is a status region representing the status of that cluster. The FAT extension 304 which represents holes within the CFAT system has a total of M entries ranging from cluster number N to (N+M−1). Small FAT B 306 has a total of P entries ranging from cluster number (N+M) to (N+M+P−1). Typically, the first cluster of a range of clusters represented by a Small FAT will be allocated to contain the Small FAT itself. Accordingly, the first status region (N+M) within the range represented by the Small FAT B has a "−1" indicating that the Small FAT B will be stored in this region. Small FAT C 308 has a total of X entries ranging from cluster number (N+M+P) to (N+M+P+X−1). Likewise, the first cluster in the range of clusters represented by Small FAT C is allocated to contain the Small FAT C itself. Hence, status region (N+M+P) has a status of minus "−1". Other status regions within Small FAT B or C may contain a "0", "−1" or other indicator depending upon the files stored using the Small FAT system at the time.

In one embodiment of the present invention, files having sizes larger than the cluster size of the CFAT file system will be stored using the Large FAT file system. All other files may be stored using one of the Small FAT file systems, using a selection policy set by a system user. An example of a selection policy is to store a file in the Small FAT file system having the biggest cluster size such that the cluster size of the Small FAT file system is less than the size of the file to be stored. Using this policy, in a CFAT file system that is a combination of a Large FAT file system with a 64 k cluster size and a Small FAT file system with a 1 k cluster size, a file whose size is greater than 64 k would be stored in the Large FAT file system. Files with less than 64 k may be stored in the Small FAT file system.

In a preferred selection policy for storing files, files may be stored in two different FAT file systems of the CFAT file system. This technique results in efficient storage and access for the stored file. For example, consider a CFAT file system having a Large FAT file system with a cluster size of 64 k, a Small FAT file system B with a cluster size of 32 k, another Small FAT file system C with a cluster size of 16 k, and any other number of Small FAT file systems. Logical clusters in a file are stored using a FAT system with the largest cluster size possible up until the last logical cluster. If this last logical cluster can fit within a smaller cluster size of one of the Small FAT file systems, then it is allocated to that Small FAT file system, if not, it is allocated to the larger FAT file system along with the rest of the logical clusters for that file.

Using the above CFAT file system example, a file of size 128 k would be allocated to two clusters each of size 64 k in the Large FAT file system. A file of size 160 k would be allocated to two clusters of 64 k in the Large FAT file system, and one cluster of size 32 k in the Small FAT file system B. A file of size 144 k would be allocated to two clusters of 64 k, and one cluster of size 16 k using the Small FAT file system C. A file of size 162 k (64 k+64 k+34 k) would be allocated to three clusters of 64 k because the last logical unit of the file of 34 k is too large to fit in a cluster of size 32 k in the Small FAT file system B. Alternatively, if a Small FAT file system having a cluster size of 2 k exists in the CFAT file system, it would be possible to store the last 34 k as one cluster of 32 k and one cluster of 2 k. It is contemplated that other techniques and selection policies for storing a file optimally in a CFAT file system may be used. A given policy may balance the desire for fewer allocated clusters against a desire to reduce disk fragmentation and to reduce wasted space.

In one embodiment, the storage space from the Large FAT file system is pre-allocated to each of the constituent Small FAT file systems. However, this pre-allocation rigidly defines regions on disk for the Small FAT file systems when that space may not actually be required. In a preferred embodiment, the Small FAT file systems are stored as files with holes in the Large FAT file system. In other words, each of the files of the Large FAT file system that is actually a Small FAT file system, is stored as a file of holes until space needs to be allocated. As described above, a "hole" is a logical cluster of a file that contains only zeros (or some other identifiable pattern) and does not occupy disk space. One possible implementation of holes within a FAT file system is provided in U.S. patent application entitled "File Allocation Tables with Holes" by inventors Thomas K. Wong and Peter Madany, Ser. No. 08/669,632 (allowed), filed Jun. 24, 1996.

By implementing Small FAT file systems as files with holes in the Large FAT file system, clusters of the Small FAT file systems that are not yet allocated are represented in the Large FAT file system as holes, thus avoiding the need to pre-allocate all of the storage space for the Small FAT file systems. The only disk storage space needed to be pre-allocated for each of the Small FAT file systems is for the meta data (i.e., the boot block data and the file allocation table for that particular Small FAT file system). Another advantage of using files with "holes" is that space occupied by "deleted" small files can be reclaimed.

Figure 6:
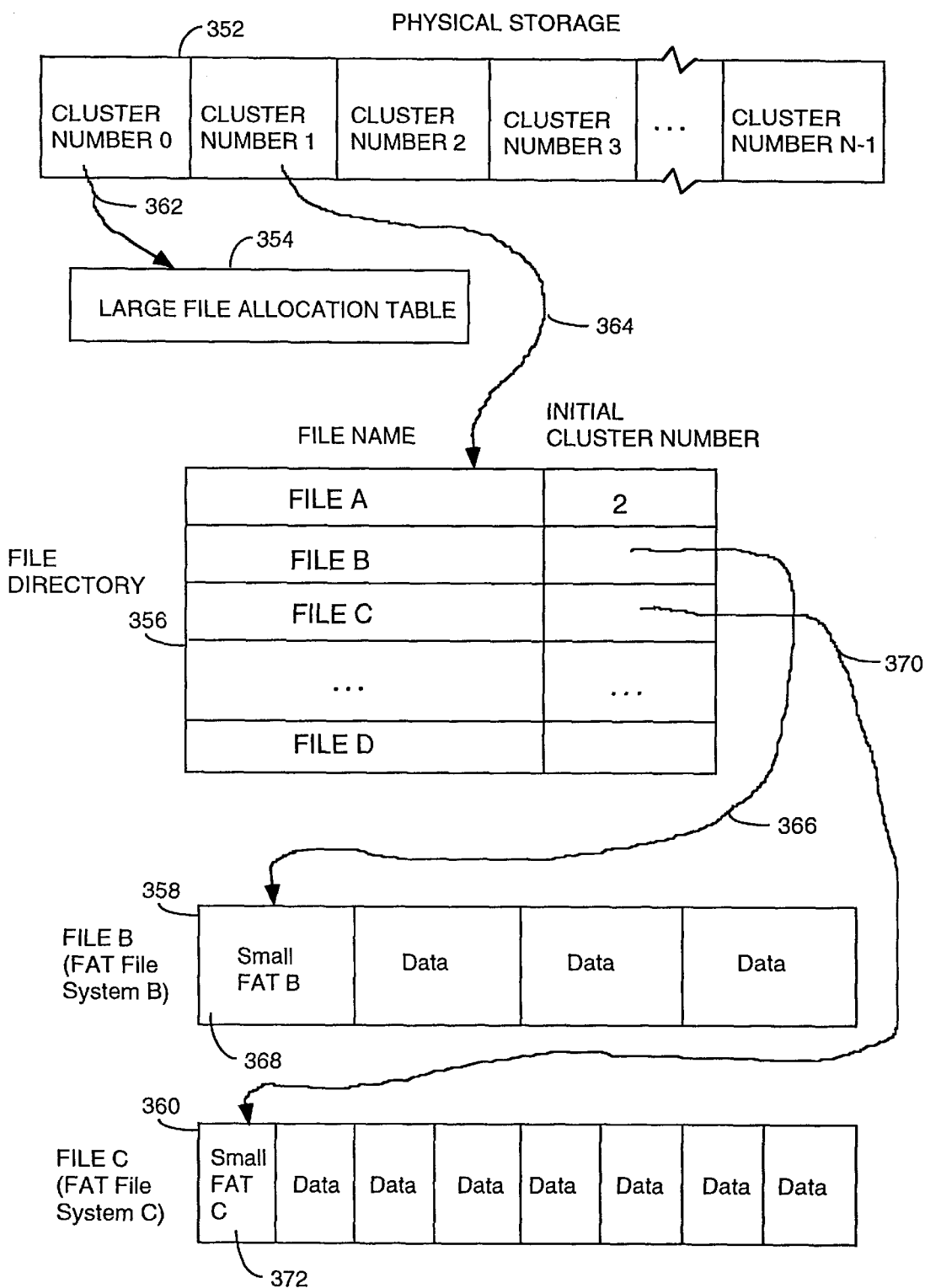
FIG. 6 illustrates a large file allocation table, a file directory and two smaller FAT file systems according to one embodiment of the present invention.

One possible implementation of a CFAT file system having large and small file systems is shown in FIG. 6. The CFAT file system 350 has physical storage 352, a large file allocation table 354 used with a Large FAT file system, a file directory 356, a Small FAT file system B 358, and a Small FAT file system C 360. The physical storage 352 has physical clusters that range from cluster number 0 to cluster number N−1. In this example, the large file allocation table 354 is stored at cluster number 0 in the physical storage as indicated by pointer 362. The large file allocation table 354 is used to allocate and indicate the status of the physical clusters 0 to N−1 in the physical storage. Also in this example, file directory 356 is stored at cluster number 1 of the physical storage as indicated by pointer 364.

The file directory 356 has a first column File Name that contains the names of files within the CFAT file system, and a second column Initial Cluster Number indicating the first cluster for a particular file. Within the file directory are a File A and a File D that are user files (not shown). Also within the file directory are a File B and a File C, each of which represents a Small FAT file system. Other Small FAT file systems may be represented within the file directory. For File B, its initial cluster number is represented as a pointer 366 which points to the location in physical storage for the first cluster for File B. Likewise, File C has an initial cluster number represented by a pointer 370 which points to the location of the first cluster in physical storage for File C. In this embodiment, the first cluster of File B and the first cluster of File C are each stored in physical storage because they each contain respectively the file allocation table for the Small FAT file system B that is contained in File B and the Small FAT file system C that is contained in File C. Accordingly, the first cluster 368 of File B contains the file allocation table B for that file. Likewise, the first cluster 372 of File C contains the file allocation table C for that file.

Although not shown in detail in this figure, Files B and C have cluster sizes that are smaller than that allocated by the large file allocation table. Also, those clusters of Files B and C that contain data will be present in physical storage, while those clusters that are not yet allocated may be represented as holes within the CFAT file system. In this fashion, it should be appreciated that the Large FAT file system as represented by the large file allocation table and the file directory are able to treat Files B and C as normal files within the Large FAT file system, even though internally these files contain smaller FAT file systems. Thus, to the outside user the overall file system appears as simply a Large FAT file system. Techniques for using the CFAT file system advantageously are now described below.

FIG. 7 shows a directory of file allocation tables 400 used in a CFAT file system in one embodiment of the present invention. The table 400 is used to determine which FAT file system to use for writing a particular file, and for determining in which FAT file system a cluster of a file is located when reading a file. Each row of the table corresponds to a particular file allocation table and file system within the combined system. A first column 401 identifies a particular file system. A second column 402 indicates the total number of clusters available in the particular file allocation table. A third column 404 indicates where that particular file allocation table may be found within the combined system. A fourth column 406 indicates the cluster size for each file allocation table. For example, the main, or Large FAT for the CFAT file system has a total of N clusters ranging from cluster number 0 to N−1, each having a size of 64 k. Holes within this combined system are represented in a FAT extension which also has a cluster size of 64 k, and has M entries. Cluster numbers for the FAT extension range from N to (N+M−1).

The combined system may have any number of smaller file allocation tables. In this example, the directory 400 includes small file allocation tables B and C, contained respectively within a File B and a File C. The Small FAT file system B has a total of P clusters each of size 32 k, and may be found in File B. In other words, the Small FAT file system B may be found by referencing the file name File B in the file directory 356 of FIG. 6. Cluster numbers for the Small FAT file system B range from (N+M) to (N+M+P−1). Likewise, the Small FAT file system C has X total clusters each of size 16 k, and is located in File C. Cluster numbers for Small FAT file system C range from (N+M+P) to (N+M+P+X−1). As shown in the table at row 410 any number of other small file systems may be included within this CFAT file system having different cluster sizes. It is also contemplated that other small file systems may have the same cluster sizes.

This table may be used in various fashions in embodiments of the present invention. In one embodiment, the table may be used either to determine a particular FAT file system given a cluster number, or to determine a particular FAT file system given a cluster size. For example, given a cluster number which is within the range from (N+M) to (N+M+P−1), the table may be used to indicate that this cluster number has been allocated within the Small FAT file system B and is contained in File B. This determination is useful if the particular cluster at that cluster number is either to be written to the file system, or if it must be read from the file system. The table is also of particular use in a write operation to maximize efficiency of the CFAT file system. For example, if a user is writing a block of size 20 k, by reference to the fourth column of table 400 it can be determined that 20 k is greater than the cluster size of 16 k but less than the cluster size 32 k; thus this block would fit within a cluster for the Small FAT file system B but not within a cluster for the Small FAT file system C. However, based upon user choices, it may be decided to allocate two clusters of 16 k each for this 20 k block instead of one cluster of 32 k. Alternatively, if a Small FAT file system Y having a cluster size of 4 k exists in the CFAT file system, it may be determined by reference to the fourth column of the table that the 20 k block would fit optimally by using one 16 k cluster from the Small FAT file system C and one 4 k cluster from the Small FAT file system Y. This fourth column may also be used in other ways to optimally fit a file into the CFAT file system.

Figure 8:
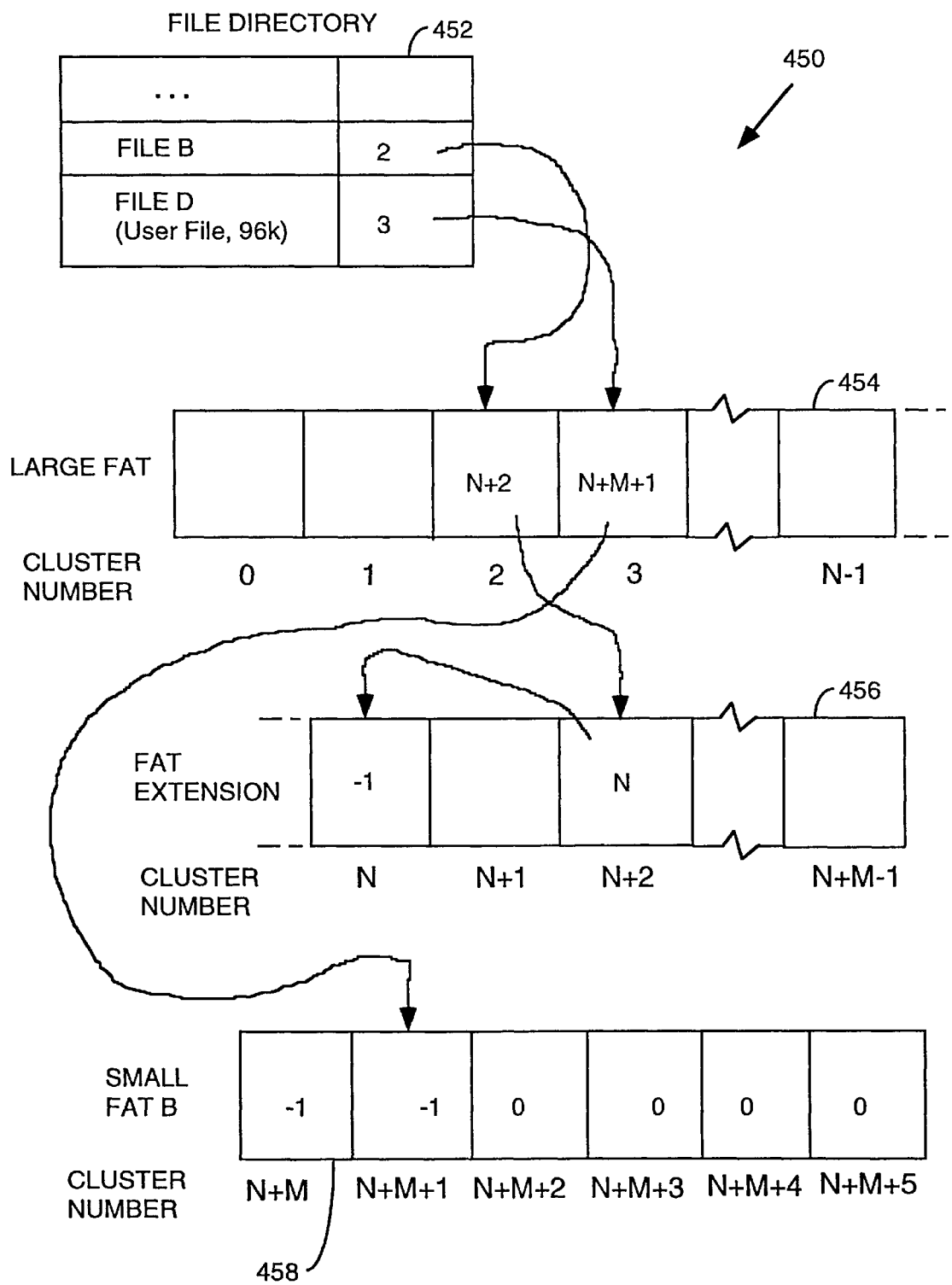
FIG. 8 illustrates a combined FAT file system having a file directory, a large file allocation table, a FAT extension, a small FAT file system B, and a user file D.

FIG. 8 illustrates an example of a use of a CFAT file system 450 having a large file allocation table, one small file allocation table, and a user File D. The CFAT file system 450 includes a file directory 452, a large file allocation table 454, a FAT extension 456, and a small file allocation table B 458. Within the file directory of the combined system are a File B and a File D. In this example, File B represents the Small FAT file system B and the File D is a user file of 96 k in length. In this example, the cluster size of each of the clusters in the file system B is half the size of the clusters represented in the Large FAT file system (for example, 32 k versus 64 k).

The file directory indicates that File B has an initial cluster number of "2" within the combined system. This indicates that the first two clusters of File B are stored at cluster number two in physical storage. Because each cluster of File B is half the size of one physical cluster, these two clusters of File B will fit within one physical cluster of the Large FAT file system. The Large FAT 454 indicates at entry "2" that the next allocated cluster for File B is cluster number N+2. Because cluster number N+2 is within the FAT extension, this indicates that the next two clusters of File B are currently represented as holes. Also, the FAT extension indicates that the third cluster for File B is represented by cluster number N. As cluster number N is also within the FAT extension, this indicates that the last two clusters of File B are also currently represented as holes. The status within the FAT extension for cluster number N is a "−1", indicating that this is the last allocated cluster for File B. Within the Large FAT and the FAT extension, only three clusters are allocated for File B because each of these clusters is twice the size of a File B cluster. Thus, File B currently has allocated physical storage for its first two clusters, whereas its remaining four clusters are not represented in physical storage but are currently represented as holes. In this fashion, the smaller clusters of File B are only allocated physical storage when needed.

In addition to the Large FAT indicating the location of clusters for File B, the Small FAT B indicates the status of each of these smaller clusters of the Small FAT file system B. That is, the Small FAT B 458 indicates a status for each of the smaller clusters within File B. These clusters range from cluster number (N+M) to cluster number (N+M+5). Because the first two clusters of File B are currently physically stored at cluster number 2 in physical storage, both of these clusters of File B have a status of "−1" indicating that they are currently allocated. The remaining four clusters of File B are currently not utilized. Therefore, each of these four clusters is not allocated to physical storage, and each currently has a status of "0".

Next, it will be explained how a user File D may be represented within the CFAT file system of the present invention. The following procedure for accessing File D may be used when reading a cluster of File D. Assuming that the Large FAT represents clusters of size 64 k, and assuming that the Small FAT B represents clusters of 32 k, it may be seen that for a user File D of 96 k in length, it would be wasteful to store this whole file using clusters of size 64 k.

Using only the Large FAT, two clusters of a total of 128 k would be needed in order to store File D, resulting in a wasting of 32 k of space. However, using the combined system, the first 64 k of user File D may be stored using the Large FAT, and the remaining 32 k may be stored using the Small FAT B. This efficient storage results in an extra 32 k of disk space that may be used for storing other files.

The file directory 452 shows that for File D its initial cluster number is cluster number 3. Accordingly, the first 64 k of File D is stored in physical storage at cluster number 3. By reference to the Large FAT 454, it may be seen that the next cluster for File D after cluster number 3 is cluster number (N+M+1). By reference to the directory of file allocation tables 400 of FIG. 7, it can be seen that this cluster number of (N+M+1) is a cluster number contained within the Small FAT file system B. By reference to this row of the directory 400, it is then determined that the Small FAT file system B is found in File B and has a cluster size of 32 k. Analysis of this row of the table also produces the result that the cluster (N+M+1) is the second cluster of File B (by comparison to the range of cluster numbers).

Accordingly, this cluster number references the second cluster of the Small FAT file system B as is shown in FIG. 8. Because every two clusters of File B are stored in one of the large clusters of the Large FAT file system, it may be determined that the second cluster of File B is stored in the first allocated physical cluster for File B. As shown in FIG. 8, this first physical cluster for File B is cluster number 2. Furthermore, because cluster (N+M+1) is the second cluster (and not the first), it is found in the second half of physical cluster 2 and not the first half. Typically, the first cluster of a file that is a Small file system may be reserved for the file allocation table for that file system. Thus, the first 64 k of File D is stored at physical cluster number 3, while the second portion of 32 k of File D is stored in the second half of physical cluster number 2 by way of the Small FAT file system. This efficient storage avoids the need to allocate one whole physical cluster of 64 k for the remaining 32 k of File D.

Figure 9:
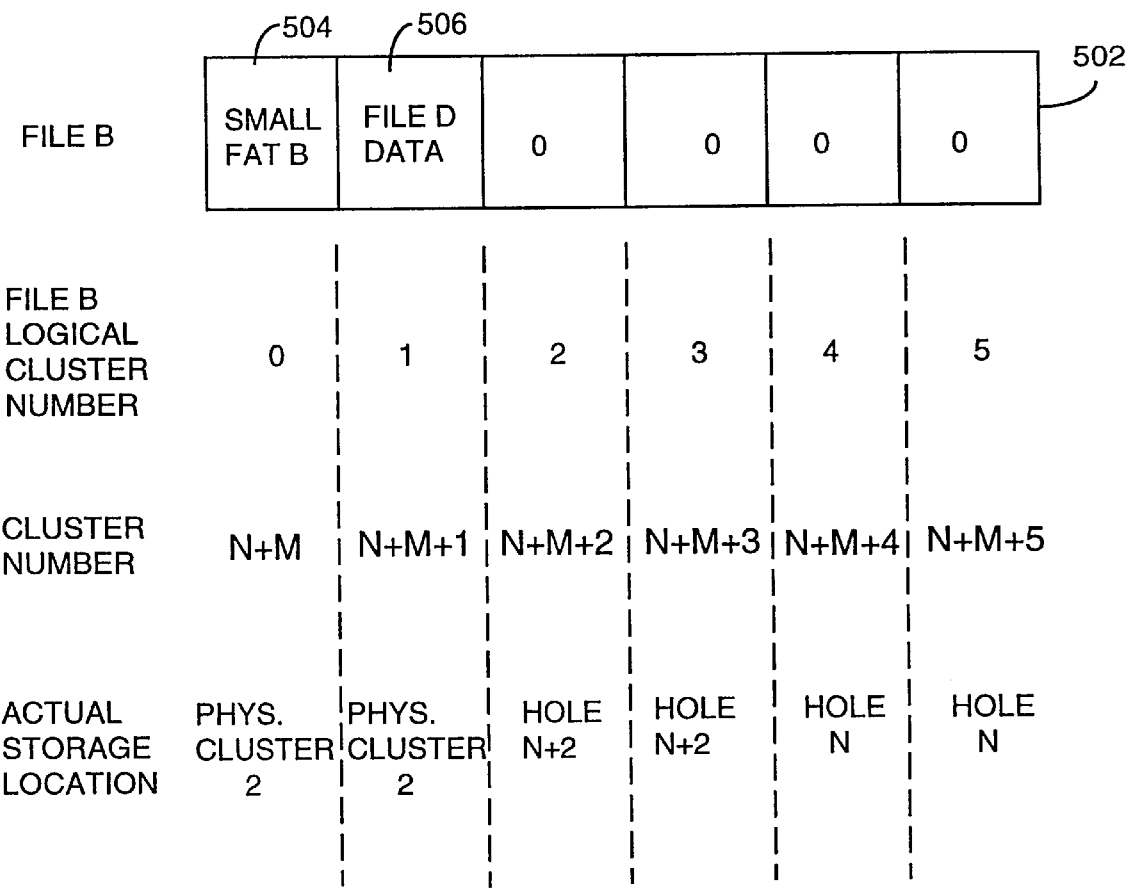
FIG. 9 illustrates symbolically an organization of a small FAT file system B and the relationship between the logical cluster numbers for this file, the cluster numbers and the storage locations.

FIG. 9 illustrates the organization of File B described above along with the relationship between the File B logical cluster numbers, the cluster number and the actual storage location where the information is stored. File B 502 has six clusters each of 32 k in size. File B 502 has stored in its first cluster 504 the file allocation table B for the Small FAT file system B that is stored in File B. Stored in the second cluster 506 of File B is the remaining 32 k of data for File D as shown in FIG. 8. Relative to File B only, these clusters may be referred to as the File B logical cluster numbers and are numbered from 0 to 5. Within the overall combined system however, each of these clusters has a corresponding cluster number which ranges from N+M to (N+M+5). As shown in FIG. 8, the first two clusters of File B are physically stored at cluster number 2 in physical storage. The remaining four clusters of File B are currently represented as holes within the combined system. Thus, as shown in FIG. 8, the second two clusters of File B are represented as a hole in the FAT extension as cluster number N+2. Likewise, the third two clusters of File B are represented as a hole at cluster number N. As explained above, a cluster number in the range from 0 to N−1 represents actual allocated physical storage, while a cluster number in the range from N to (N+M−1) indicates a hole that is stored in the FAT extension.

Figure 10:
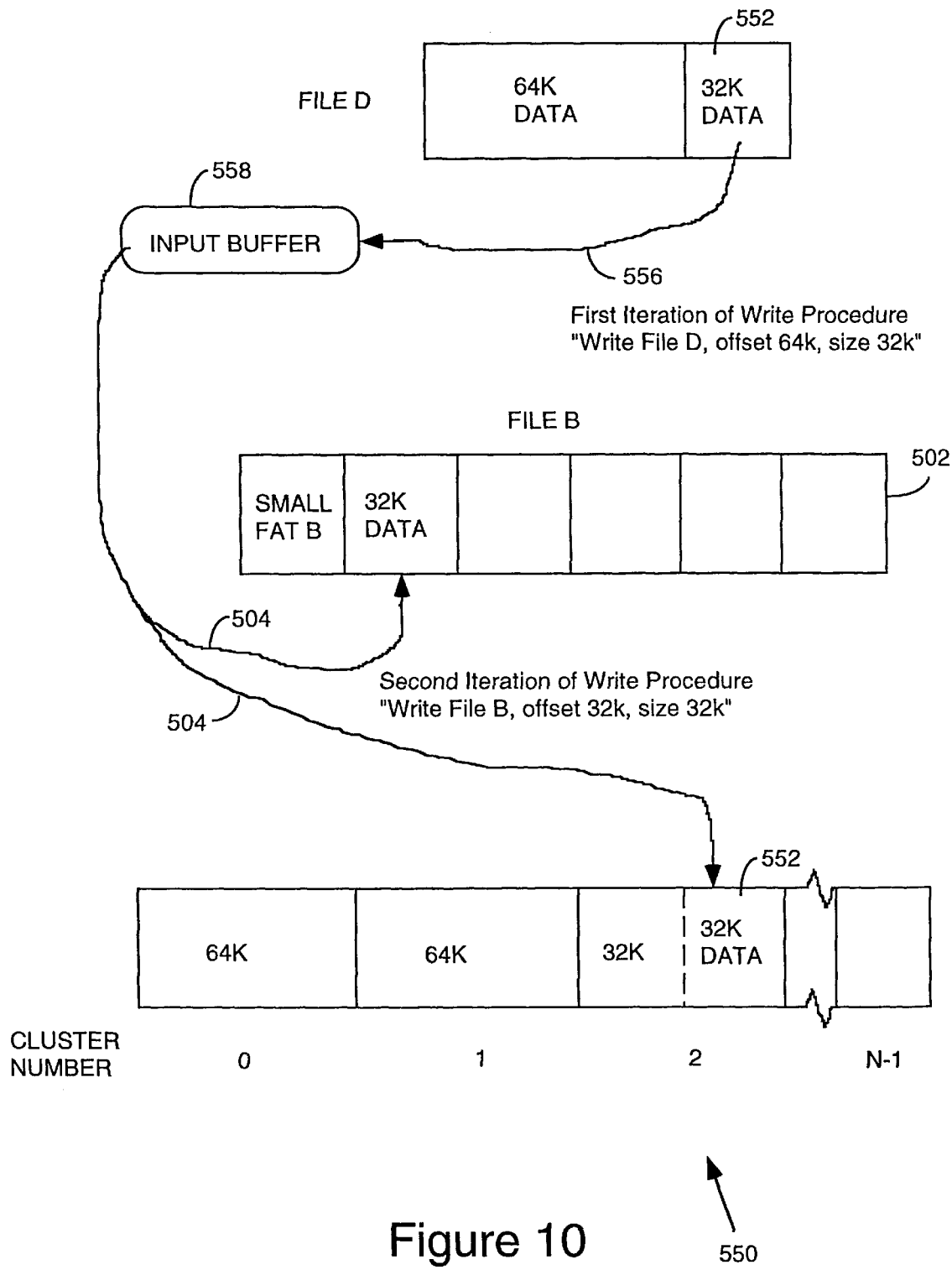
FIG. 10 illustrates conceptually how data from a file D is written to physical storage using a FAT file system B according to one embodiment of the present invention.

FIG. 10 illustrates conceptually how a procedure 550 for writing data from File D to physical storage might look. Because the CFAT file system makes use of smaller FAT file systems within a large FAT file system, a write or read procedure of the present invention may be called twice in order to write data to physical storage or to read data from physical storage in one embodiment of the present invention. This technique of calling a write procedure a second time for a write to a Small FAT file system will be discussed in more detail below with reference to FIG. 11f. A corresponding technique for a read procedure will be discussed in more detail below with reference to FIG. 13. A write operation is illustrated conceptually in FIG. 10.

File D contains a total of 96 k of data. The first 64 k of data may be stored as a 64 k size cluster within a Large FAT file system. However, the remaining 32 k of data may be stored within a smaller FAT file system B. At some point in a write procedure, a command is given to write to File D at an offset of 64 k for a size of 32 k. In this first iteration through the write procedure this 32 k of data is stored in an input buffer 558 as shown symbolically by arrow 556. Because the Large FAT file system only handles clusters of size 64 k, a second iteration through the write procedure is needed to write the 32 k of data into the Small FAT file system B which has a cluster size of 32 k.

Once this 32 k of data has been temporarily stored in an input buffer, it may then be written to physical storage by way of Small FAT file system B. On a second iteration through the write procedure, a command is given to write to File B at an offset of 32 k for a size of 32 k. This second iteration of the write procedure takes the 32 k of data from the input buffer 558 and then writes it to physical storage at cluster number 2 as shown symbolically by arrow 562. Arrow 564 also shows symbolically how this 32 k of data is also being stored as the second cluster of File B. This writing saves space because only 32 k of a 64 k block of physical storage is used. The remaining 32 k of this 64 k block may be used to store data from another file. The use of this method of writing data to a file will be explained in more detail below with reference to FIGS. 11a–11f. A read operation is performed conceptually in a similar manner and will be described in more detail below with reference to FIGS. 12a–12c.

Figure 11A:
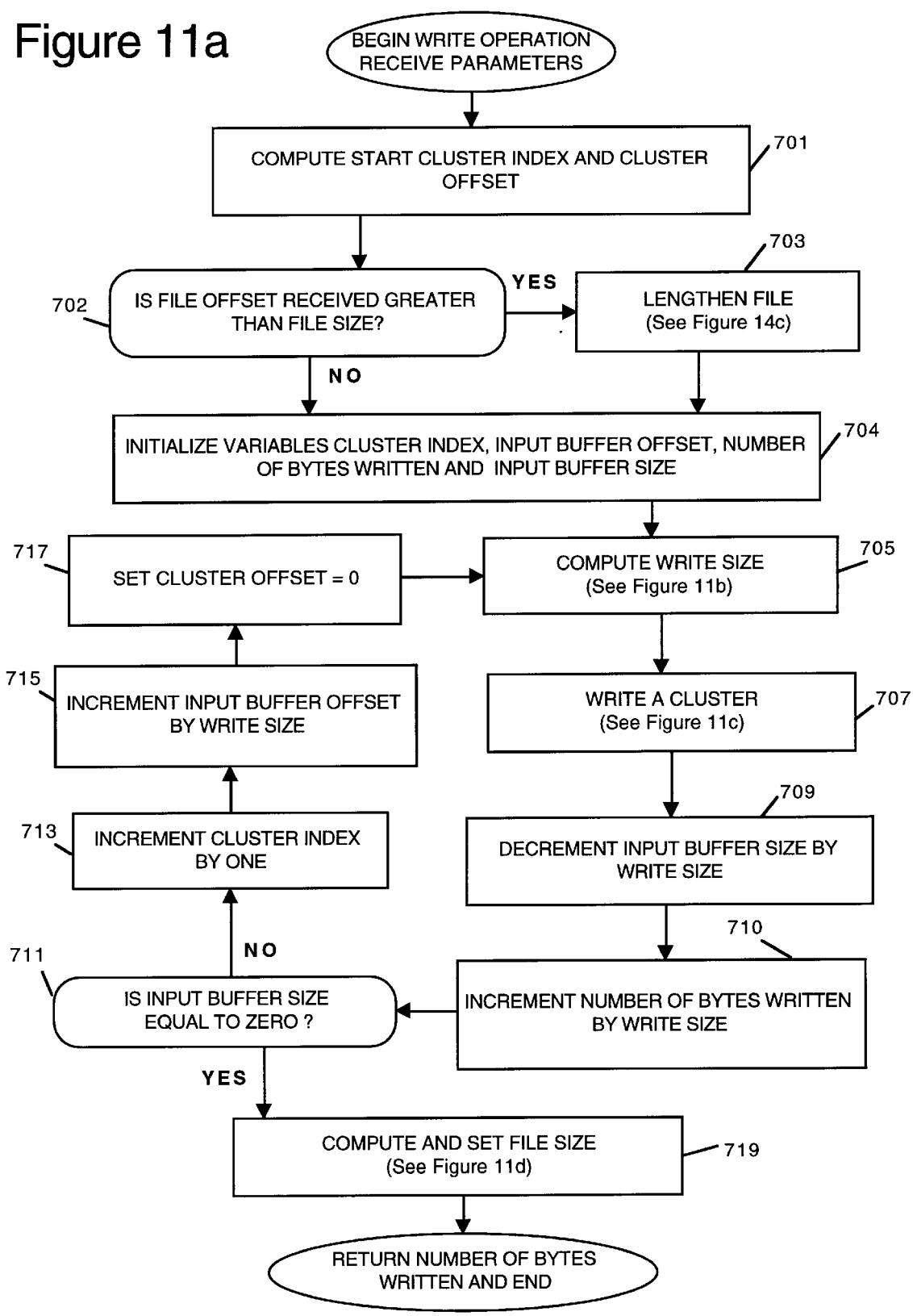
FIG. 11a is a flow chart representing a write operation in accordance with one embodiment of the present invention.

Turning now to FIG. 11a, a flow chart representing a write operation for an embodiment of the present invention is shown. Typically, a file system will accumulate data until the amount of modified data reaches or exceeds a particular size. The write operation will then write the data to disk. As mentioned above, in one embodiment of the present invention, the largest clusters possible for a file are written to physical storage until a last remaining portion of the file is reached. If this remaining portion may be stored entirely in a smaller cluster using one of the Small FAT file systems, then the write procedure is called a second time to write to the file containing the Small FAT file system. This second iteration call will be explained in more detail below with reference to FIG. 11f.

The write operation begins in FIG. 11a by receiving input parameters. Four variables are input to the write operation: the Input Buffer, the Initial Input Buffer Size, a File Offset and an Open File Descriptor. The variable Input Buffer is an address that indicates a data buffer that contains the data to be written to the disk. The Initial Input Buffer Size indicates the size of the Input Buffer in bytes. File Offset is the offset in the file at which data will be written. The Open File Descriptor allows the write operation to access the File Size. The Open File Descriptor may also point to the file directory and may be implemented as will be appreciated by one of skill in the art. The File Size indicates the size of the file that is being written to in bytes. One more variable is available from the file system meta data. It is the variable Cluster Size that represents the size of a cluster in bytes.

After the write operation request has been received, two variables are computed in step 701. They are the Start Cluster Index and the Cluster Offset. The Start Cluster Index represents the first logical cluster of the file to be written. The Start Cluster Index is the quotient of the File Offset divided by the Cluster Size. The Cluster Offset is the remainder of the File Offset divided by the Cluster Size. The variable Cluster Offset identifies the starting location within the cluster where the data will be written. After these variables have been calculated, control moves to step 702.

Step 702 tests whether the File Offset received is greater than the File Size. If so, then the file must be lengthened, this step being performed in step 703. This lengthen file operation will be discussed in more detail below with reference to FIG. 14c. After the file is lengthened, or if lengthening is not needed, in step 704 four variables are initialized. They include the Cluster Index, the Input Buffer Offset, Number of Bytes Written and Input Buffer Size. Cluster Index identifies the logical cluster of the file to be written and it is set equal to the Start Cluster Index. The Input Buffer Offset indicates the point in the Input Buffer from which the data is being written, and it is initialized to zero. The Input Buffer Offset is the offset within the Input Buffer from which data will be written to the disk. Also, the Number of Bytes Written is set equal to zero and the Input Buffer Size is set equal to the Initial Input Buffer Size.

In step 705 a variable Write Size is computed. This variable indicate s the number of bytes to be written in one iteration of this operation and Write Size must be less than or equal to the size of a cluster. This step will be explained in more detail below with reference to FIG. 11b. After the Write Size has been determined, a (first) cluster is written to disk in step 707. This cluster writing step will be explained in more detail below with reference to FIG. 11c. After the first cluster has been written, the Input Buffer Size variable is decremented by Write Size in step 709. Then, in step 710 the variable Number of Bytes Written is incremented by Write Size to indicate the total number of bytes that have been written to the disk. At this point, a determination is made as to whether the last cluster for the Input Buffer has been written. This is accomplished by comparing the Input Buffer Size to zero in step 711. If Input Buffer Size equals zero then the write operation is complete and control moves to step 719. If not, then the write operation is not complete and control moves to step 713. Step 713 increments the Cluster Index by one in order to keep track of to which cluster to write.

Next, in step 715 the variable Input Buffer Offset is incremented by Write Size. In step 717 the variable Cluster Offset is set equal to zero because any partial cluster has been written, and remaining clusters will be written from their beginning. From step 717 control loops back to step 705 and the operation continues to another iteration as discussed above. In step 719 the variable File Size is computed and set to indicate the new End of File for the file on the disk. This step will be explained in more detail below with reference to FIG. 11d. Next, the write operation ends and the variable Number of Bytes Written is returned to the calling entity.

Figure 11B:
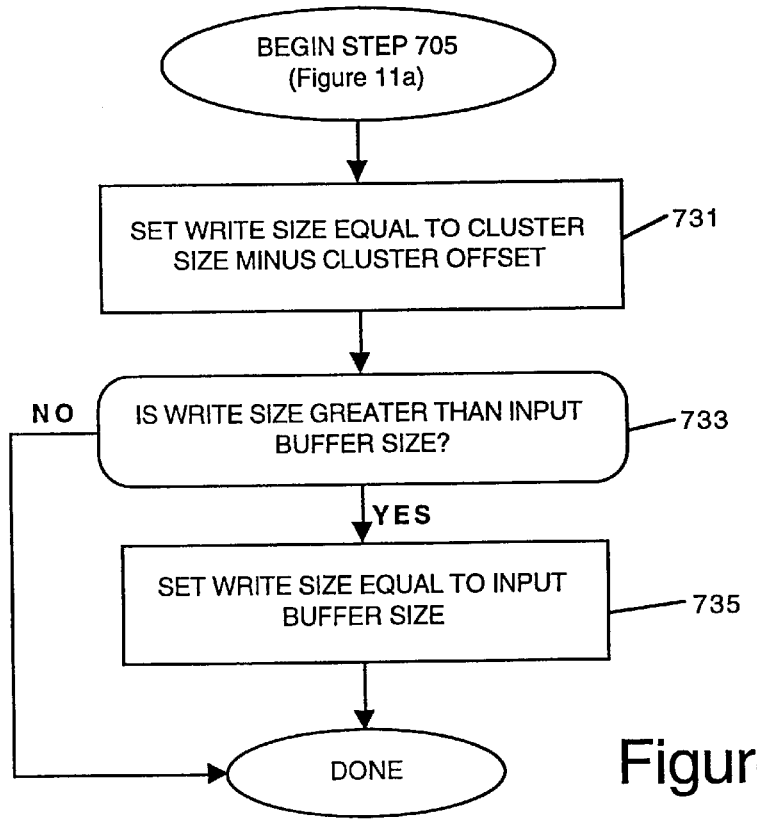

FIG. 11b shows a flow chart for computing the Write Size for the number of bytes to be written. For the first and last clusters written, Write Size may not be the same as the Cluster Size because a write may be beginning or ending within a cluster. For intermediate clusters, Write Size will be the same as Cluster Size. In step 731 the Write Size is set equal to the Cluster Size minus the Cluster Offset. The Write Size must be less than or equal to the size of a cluster. In the first iteration of the write operation of FIG. 11a the Write Size may be smaller than a Cluster Size if there is a Cluster Offset. That is, if the data to be written to disk begins in the middle of the cluster. On subsequent iterations through the write operation Write Size will be equal to the size of a cluster because the Cluster Offset will have been set to zero in step 717. Step 733 tests whether Write Size is greater than the Input Buffer Size. If the Write Size is not greater than the Input Buffer Size this indicates that the data remaining in the Input Buffer to be written is greater than a cluster and the Write Size remains at the size of a cluster and this step 705 is done.

However, if Write Size is greater than the Input Buffer Size, this indicates that the end of the Input Buffer has been reached, and that the data remaining to be written is less than the size of a cluster. In that case, in step 735 Write Size is set equal to the data remaining, i.e., the Input Buffer Size. Note that the Input Buffer Size changes as iterations are made through the write operation because the variable Input Buffer Size is decremented by Write Size in step 709. After step 735, step 705 compute write size is done.

Figure 11D:
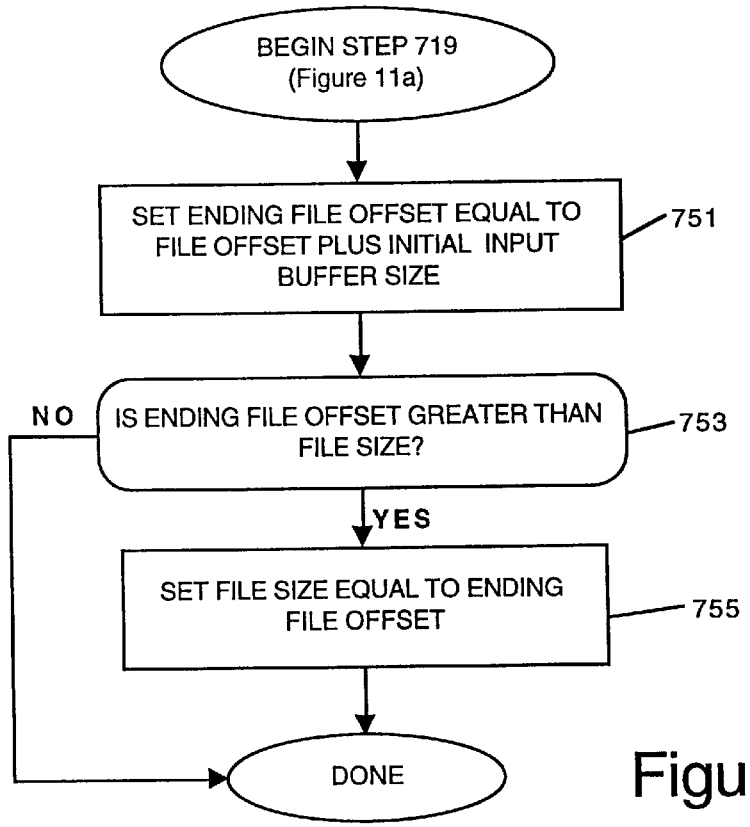
Figure 11C:
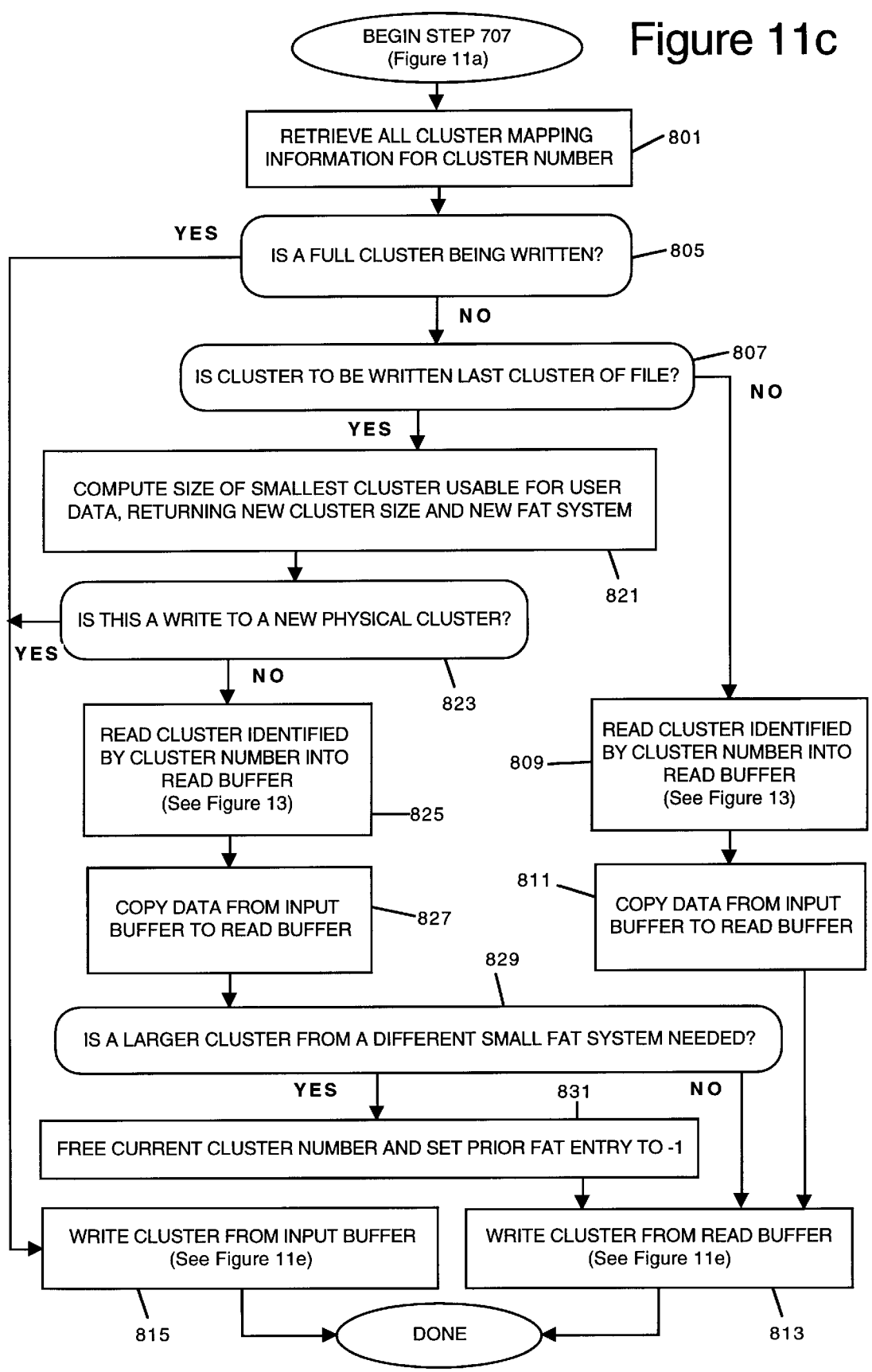
FIG. 11c is a flow chart representing the write cluster step 707 used in one embodiment of the write operation of FIG. 11a to write a whole or partial cluster.

FIG. 11c shows a flow chart for writing a cluster. In step 801 all cluster mapping information for the Cluster Index is retrieved. For example, the variable Open File Descriptor may be used to access the file directory, which in turn may be used follow the linked list to determine where the logical cluster of the file is represented. For example, the logical cluster of the file indicated by the Cluster Index may be stored on disk at a particular Cluster Number, or it may be represented as a "hole" in the FAT extension. In either case, the logical cluster of the file will have an associated Cluster Number, the Cluster Number being less than or equal to N−1 for a logical cluster stored on a disk and greater than or equal to N but less than N+M (for example) for a logical cluster that is represented as a "hole" in the FAT extension. For a logical cluster that is represented in a Small FAT file system, the Cluster Number may be greater than N+M, thus indicating that this cluster is not represented as a large cluster nor as a hole, but is stored in one of the small FAT file systems. Of course, other numerical conventions may be used to represent where a logical cluster is stored.

Step 805 tests whether a full cluster is being written. If a full cluster is being written from the Input Buffer to the disk then the cluster may be written directly. This test may be performed by comparing Write Size to Cluster Size and if Write Size is not equal to Cluster Size, it indicates that a full cluster is not being written. A full cluster may be written directly because there is no need to read in data in order to preserve it before writing. Writing a full cluster implies that all the current data of the cluster will be overwritten anyway. Also, writing a full cluster of the Large FAT file system means that using one of the Small FAT file systems is unnecessary because a full cluster will be needed. If a full cluster is being written, in step 815 this cluster is written from the Input Buffer to the disk. This cluster from the Input Buffer is written to disk using the data stored in the Input Buffer at the location Input Buffer Offset. This step 815 will be explained more fully below with reference to FIG. 11e.

If a full cluster is not being written, then this cluster may first need to be read from the disk before being written to as shown in steps 809 and 825 explained below. However, even if a full cluster is not being written, if the write is to a completely new cluster, then no cluster need be read in. This possibility is tested in step 823 explained below.

After step 805 determines whether or not a full cluster is being written, in step 807 it is determined whether the cluster to be written is the last cluster of the file. If it is not the last cluster of the file then the use of a Small FAT file system may not be required in this embodiment and control moves to step 809 in order to read in the cluster and write to it, as explained below. However, if this is the last cluster of the file, then it may be that the last cluster is currently stored in, or will be written anew to a Small FAT file system. Accordingly, if this is the last cluster of the file, then in step 821 the smallest cluster usable for this data is computed. The cluster size column 406 of the directory of file allocation tables 400 of FIG. 7 may be used to assist in this computation. For example, if a CFAT file system contains file systems that provide clusters sizes of 64 k, 32 k, 16 k, 8 k, and 4 k, and the user data is 5 k in size, then the smallest usable cluster size is 8 k, and the Small FAT file system corresponding to that cluster size is chosen. Step 821 returns both the small cluster size and the Small FAT system to be used.

Step 823 now checks whether this is a write to a new physical cluster. If so, then there is no danger of data being overwritten, and the new cluster may be written directly in step 815 as explained below. However, if this is not a write to a new cluster, because this is a partial cluster being written, the complete cluster is first read in before the partial cluster is written to it. These steps are performed below in steps 825 and 827, and in steps 809 and 811. Steps 809 and 811 are explained below; steps 825 and 827 are duplicates of 809 and 811.

Steps 809 and 811 are used when a full cluster is not being written, such as when either the Input Buffer begins at an intermediate location within a cluster or ends at an intermediate location within a cluster. If the Input Buffer begins at the beginning of a cluster and ends at the end of a cluster then these steps are not needed. The following variables are used in steps 809 and 811: Cluster Number is the cluster at which the data will be retrieved from the disk, Read Buffer is a temporary data buffer that will contain the data to be retrieved, Cluster Offset is the offset within the Read Buffer at which data from the Input Buffer will be copied to, Input Buffer contains the data to be written, and Input Buffer Offset is a location within the Input Buffer from which the data will be written to disk.

In step 809 the cluster associated with Cluster Number is read from the disk and stored in the Read Buffer. This step 809 will be explained more fully below with reference to FIG. 13. In step 811 data from the Input Buffer is copied to the Read Buffer. This step is performed by copying Write Size bytes of data from the location at the Input Buffer Offset of the Input Buffer to the location at the Cluster Offset of the Read Buffer. Next, in step 813 the cluster in the Read Buffer is written to the file on disk. This step will be explained more fully below with reference to FIG. 11e. After steps 815 and 813 have finished this step 707 of FIG. 11a is done.

Returning now to step 827, in this branch of the flow chart a partial cluster that is the last cluster of a file has just been copied into the read buffer. Because the new user data that is being written to the old cluster might in fact be longer than the old cluster, it might be necessary to use a larger cluster size to hold the data. Step 829 checks whether a larger cluster from a different Small FAT file system (or even from the Large FAT file system) is needed for this data. This check may be performed by comparing the size of the Input Buffer to the previous cluster size. If a new larger cluster is not needed, then in control moves to step 813 and the cluster is written from the Read Buffer. However, if a larger cluster is needed, then in step 831 the current cluster number is freed and the prior Large FAT entry is set to a "−1" to indicate the last cluster of the file. A new larger cluster will be allocated and inserted into the Large file allocation table as described in FIG. 11e. After step 831, step 813 is performed.

FIG. 11d is a flow chart for calculating the File Size variable. This procedure checks whether the file has increased in size, and if so, adjusts the File Size variable. The variable File Size indicates the size of the file in bytes. In step 751 the variable Ending File Offset is set equal to File Offset plus the Initial Input Buffer Size. As the variable File Offset indicates the offset from the beginning of the file on disk and the variable Initial Input Buffer Size is the total size of the data being written, the variable Ending File Offset will now indicate the new End of File if the file has increased in length. Step 753 tests whether the Ending File Offset is greater than File Size. If Ending File Offset is not greater than File Size this indicates that the file has not increased in length and the variable File Size is not changed and this procedure is done. If, however, the Ending File Offset is greater than the File Size then in step 755 the variable File Size is reset to be equal to the variable Ending File Offset. After this step 755 the procedure is done.

Figure 11E:
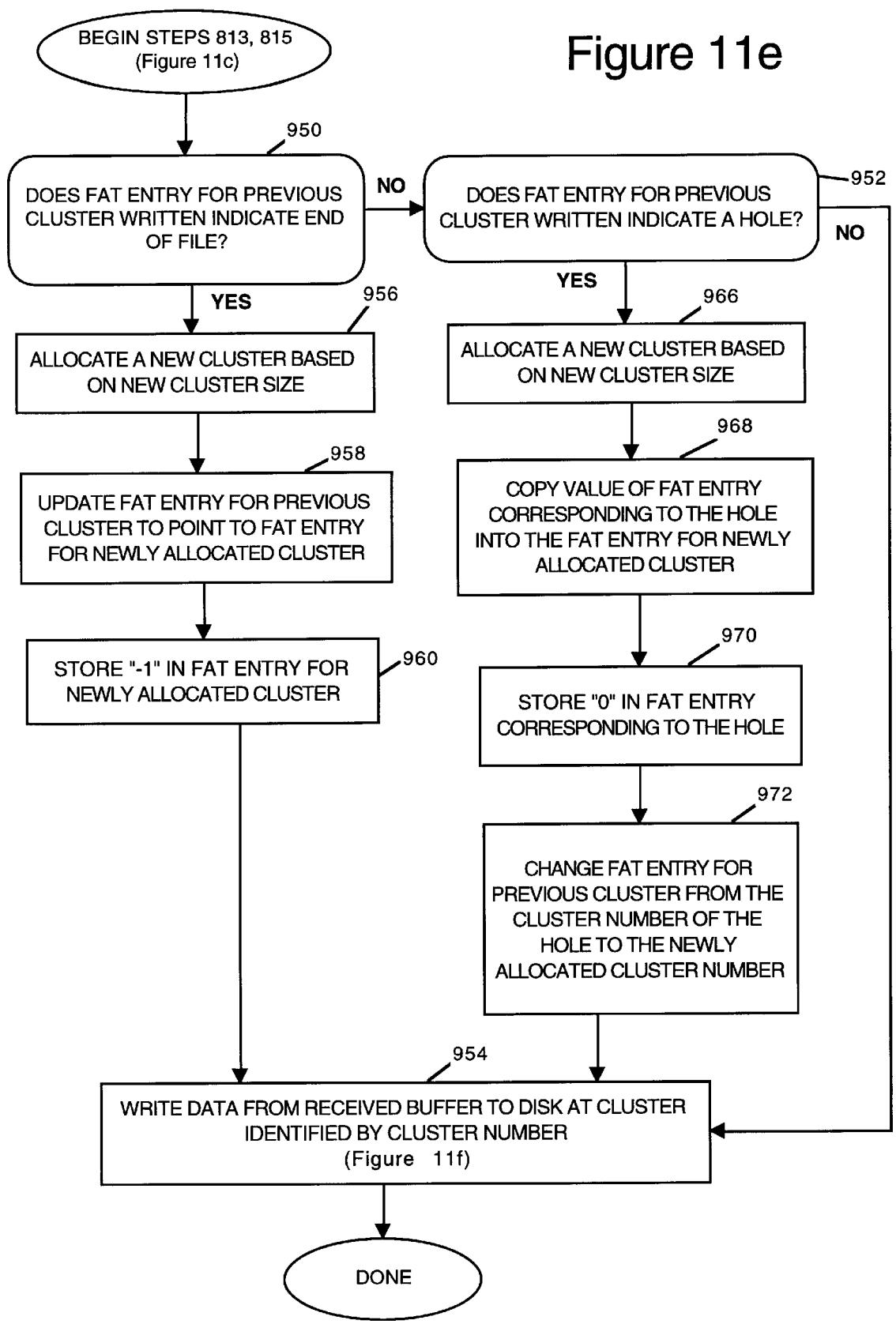
FIG. 11e is a flow chart representing the write cluster steps 813 and 815 used in one embodiment of the write cluster operation of FIG. 11c to write a whole cluster.

Referring now to FIG. 11e a procedure for updating the Large FAT or the FAT extension in the context of writing a cluster will now be described. At this point in the overall write operation, the logical cluster to be written has been mapped to its associated Cluster Number, and it is this cluster that is to be written to disk. However, because this cluster may be after the end of file, or may have been a "hole" previously, certain steps must be performed first. Also, if in FIG. 11c a new smaller cluster size was computed in step 821, or if a larger cluster size is needed as determined in step 829, then a new cluster will also be allocated in this procedure.

Step 950 determines whether the FAT entry for the previous logical cluster indicated the end of the file. The previous cluster is that logical cluster of the file that precedes the current cluster to be written. If the previous cluster indicated the end of the file (by a "−1" entry in the FAT), this means that the file is being added to and a new cluster must be allocated and the FAT updated. Thus, if the answer to step 950 is "YES" control moves to step 956 in which a new cluster on the disk is first allocated. As the new cluster size was determined in FIG. 11c, the appropriate Small FAT file system (or Large FAT file system) from which to allocate a new cluster may be determined by reference to the directory of file allocation tables of FIG. 7.

In step 958 the FAT entry for the previous cluster is updated from the quantity "−1" to a quantity that points to a FAT entry for the newly allocated cluster. Next in step 960 a "−1" is stored as the FAT entry for the newly allocated cluster because this newly allocated cluster is currently the end of the file. Next in step 954 the data from the received buffer is written to the newly allocated cluster on disk.

If, however, the answer to step 950 was "NO" this means that the previous cluster was not the last cluster of the file. Step 952 tests whether the FAT entry for the previous cluster indicates a "hole" is present for the current cluster to be written. As described above with reference to FIGS. 3 and 4, the FAT entry for a given cluster may indicate that the next cluster is stored as a "hole" if the FAT entry is greater than or equal to N and is less than N+M for this specific example. In general, a determination of whether the next cluster is a "hole" is made by reference to the directory of file allocation tables of FIG. 7. For example, the second row of this table indicates a range of cluster numbers that are indicate a "hole". If no "hole" is indicated, this means that the entry for the previous cluster indicates an actual physical cluster on disk to which data may be written for the current cluster. In such a case, control moves to step 954 and the data is written to this physical cluster as will be explained with reference to FIG. 11f. If, however, the answer to step 952 is "YES", this indicates that the current cluster to be written is currently indicated as being a "hole". In such a situation, because an actual cluster needs to be written, this entry representing a "hole" must be removed from the FAT extension, a new cluster must be allocated, and the Large FAT and the FAT extension must be updated.

In step 966 a new cluster is allocated on disk to contain the data to be written. This new cluster based upon the new cluster size may be allocated as described above in step 956. In step 968 the value of the FAT entry within the FAT extension that corresponds to the "hole" is copied into the FAT entry for the newly allocated cluster. Next in step 970 the quantity "0" is stored as the FAT entry corresponding to the "hole" in the FAT extension In step 972 the FAT entry for the previous cluster is changed from indicating a "hole" to the Cluster Number for the newly allocated cluster. Next in step 954 the cluster is written to disk as will be described below with reference to FIG. 11f. The received buffer will either be the Input Buffer or the Read Buffer as determined by FIG. 11c steps 815 or 813.

Figure 11F:
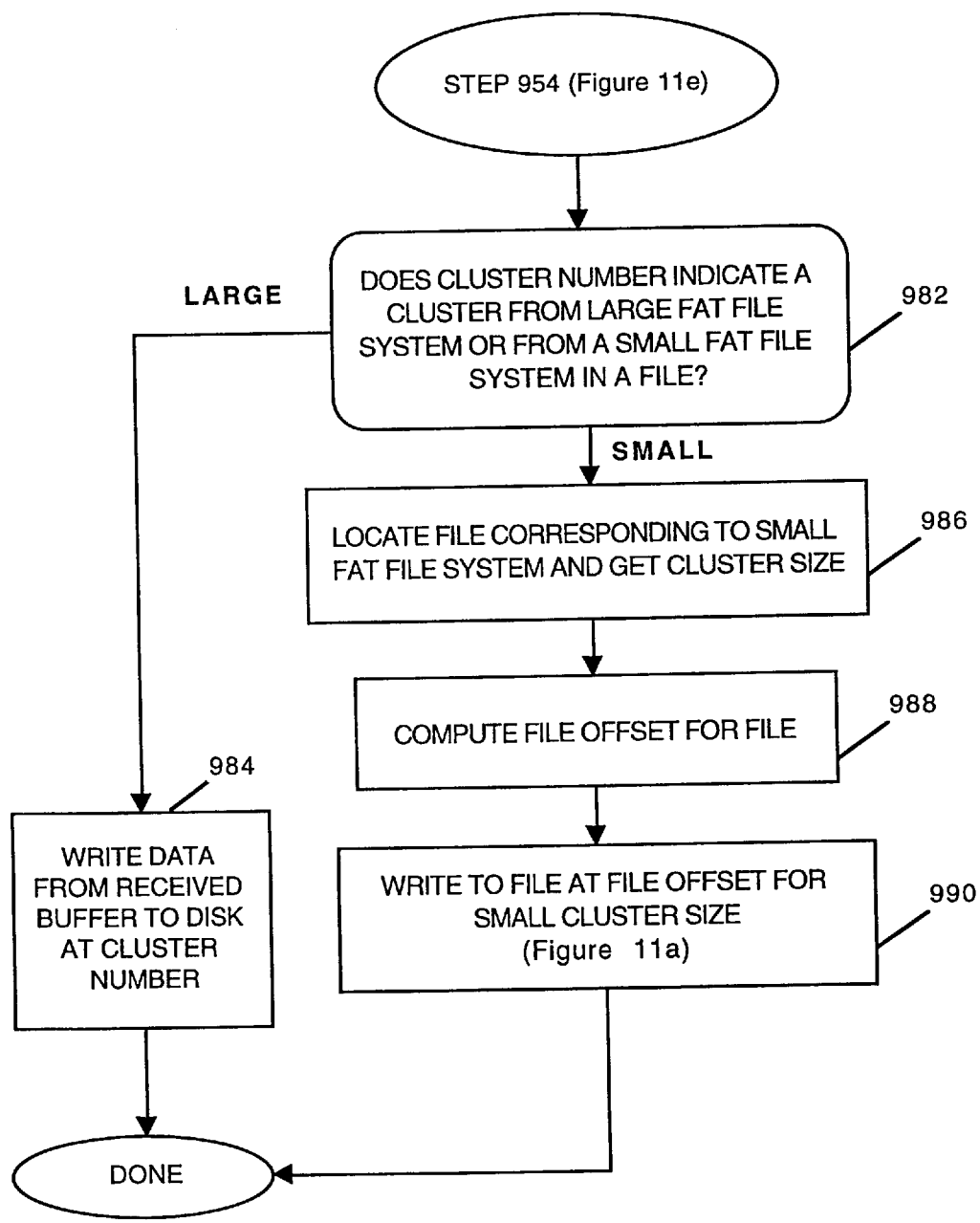
FIG. 11f is a flow chart representing the write data step 954 used in one embodiment of the write cluster operation of FIG. 11e.

FIG. 11f describes an embodiment of a procedure for either writing a cluster directly to disk or for calling the overall write procedure one more time if a Small FAT file system is being used. If the cluster number to be written indicates a cluster within the Large FAT file system, then this cluster may be written directly to the disk at that cluster number. However, if the cluster number corresponds to a cluster within one of the Small FAT file systems, then this cluster may not be written directly to disk at that cluster number because the cluster number of a Small FAT file system does not correspond directly to a physical cluster on disk. It is first necessary to map this cluster number for a Small FAT file system into an appropriate cluster of the Large FAT file system. In this fashion it is determined where the small cluster is actually stored within the Large FAT file system.

Step 982 determines whether the cluster number indicates the Large FAT file system or one of the Small FAT file systems. For example, a cluster number below N would indicate the Large FAT file system, while a higher cluster number would indicate one of the Small FAT file systems. If the Large FAT file system is indicated, then in step 984 the data from the received buffer is written to disk at the cluster number. The received buffer may be either the Input Buffer or the Read Buffer. If a Small FAT file system is indicated, then in step 986 the file within the Large FAT file system that contains the appropriate Small FAT file system is located. This file may be located by referencing the directory of file allocation tables in FIG. 7. For example, if the cluster number is "N+M+P+2", by reference to the fourth row of this table, it may be determined that cluster number "N+M+P+2" is contained in the Small FAT file system C that is located in File C and that has a cluster size of 16 k. In this example for step 986, the procedure would locate the file "File C" and a cluster size of 16 k based upon a cluster number of "N+M+P+2". Now that the actual file has been located that contains the Small FAT file system, a write may be requested to this file in order to actually write the data to the disk.

Before the write is requested, a file offset must be calculated in order to determine exactly where within the file the data should be written to. In step 988 the File Offset is computed for the located file. This File Offset may be calculated by subtracting the beginning cluster number for that file (available from the directory of file allocation tables) from the cluster number and by multiplying by the cluster size for that Small FAT file system. Next, in step 990 the file containing the Small FAT file system is written to at the File Offset for an amount of data equal to the small cluster size. This write is preferably performed by recursively calling the write procedure of FIG. 11a and passing it these parameters. On this second iteration through the write procedure, the user data will be physically written to disk in step 984, which serves as a terminating condition for this recursive call. On the second iteration, a cluster number will be calculated for this file that is stored in the Large FAT file system and that will be written to. Thus, upon reaching step 982, the procedure will branch to step 984 and the procedure will end after the second iteration.

Figure 12A:
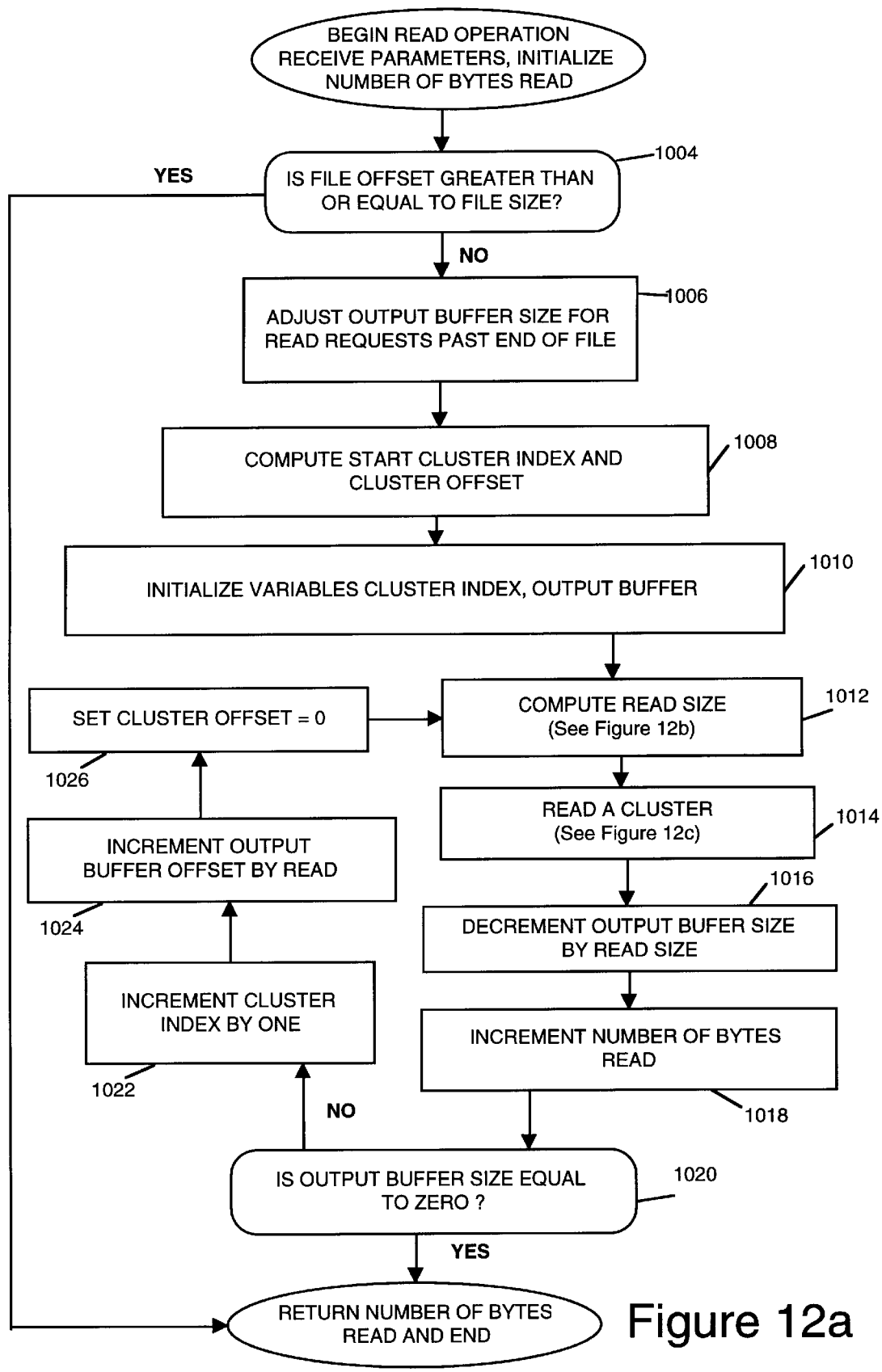
FIG. 12a is a flow chart representing a read operation in accordance with one embodiment of the present invention.
Figure 12B:
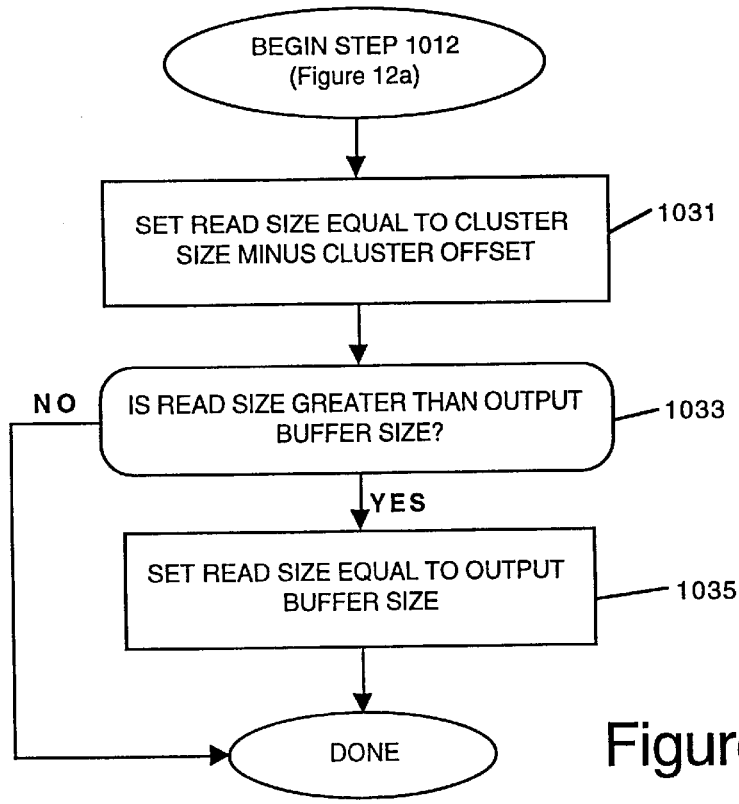
Figure 12C:
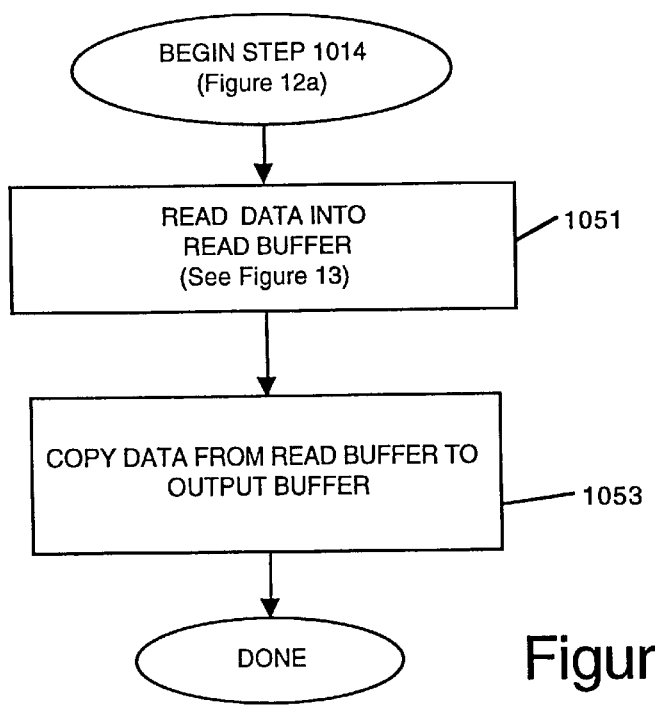

Turning now to FIGS. 12a, 12b and 12c a flow chart representing a read operation for an embodiment of the present invention is shown. This read operation allows a file or a portion of a file to be read from disk if that file is represented within a Large FAT file system or even if a portion of the file is stored by way of a Small FAT file system. In a similar fashion to the write procedure using a second iteration, the read procedure uses a second iteration when reading from a file that is stored in a Small FAT file system. This second call will be discussed in more detail below with reference to FIG. 13.

When a user reads a portion of a file at a file offset the file system will retrieve the cluster(s) that contains the bytes at that offset and return the bytes to the user. The read operation begins in FIG. 12a by receiving four input parameters: the Output Buffer, the Initial Output Buffer Size, the File Offset and the Open File Descriptor. The variable Output Buffer is an address that indicates a data buffer that will contain the data to be read from the disk. The Initial Output Buffer Size indicates the size of the Output Buffer in bytes. The File Offset is the offset in the file at which the data will be read. The Open File Descriptor allows the write operation to access the File Size. The Open File Descriptor may also point to the file directory and may be implemented as will be appreciated by one of skill in the art. The File Size indicates the size of the file that is being read in bytes. One more variable is available from the file system meta data; the variable Cluster Size represents the size of a cluster in bytes (for clusters of the Large FAT file system). Also, the variable Number of Bytes Read is initialized to zero.

In step 1004 the File Offset is compared to the File Size. If File Offset is greater than or equal to the File Size this indicates that an attempt to read past the end of the file exists and the read procedure will return zero for Number of Bytes Read and end. On the other hand, if File Offset is less than File Size then control moves to step 1006. In step 1006, the Output Buffer Size is first set to the Initial Output Buffer Size. The Output Buffer Size may be further adjusted if it is determined that the read operation will request data past the end of the file. If the Output Buffer Size is greater than File Size minus File Offset, this means the request is past the end of the file. If so, Output Buffer Size is set to File Size minus File Offset.

In step 1008 two variables are computed, namely Start Cluster Index and Cluster Offset. The variable Start Cluster Index is the quotient of the File Offset divided by the Cluster Size. The Cluster Offset is the remainder of the File Offset divided by the Cluster Size. The variable Cluster Offset identifies the location within the cluster from where the data will be read. Once these variables are computed, two variables are initialized in step 1010. Cluster Index identifies the cluster to be read and it is set equal to the Start Cluster Index. The Output Buffer Offset indicates the point in the Output Buffer to store the data being read from disk, and it is initialized to zero. The Output Buffer Offset is the offset within the Output Buffer to store the data that will be read from the disk.

In step 1012 the variable Read Size is computed. This variable indicates the number of bytes to be read in one iteration of this operation and Read Size must be less than or equal to the size of a cluster. This step will be explained in more detail below with reference to FIG. 12b. In step 1014 a cluster is read from disk into the Output Buffer. This step will be explained in more detail below with reference to FIG. 12c. In step 1016 Output Buffer Size is decremented by Read Size to indicate the number of bytes to be read from disk. In step 1018 the variable Number of Bytes Read is incremented by Read Size to indicate the total number of bytes that have been read from the disk. Next, step 1020 tests whether the Output Buffer Size is equal to zero. If so, then Number of Bytes Read is returned and the read operation is complete. If not, then the read operation is not complete and control moves to step 1022. Step 1022 increments the cluster index by one in order to keep track of which cluster to read. Next, in step 1024 the variable Output Buffer Offset is incremented by Read Size. In step 1026 the variable Cluster Offset is set equal to zero. From step 1026 control loops back to step 1012 and the operation continues to another iteration as discussed above.

FIG. 12b shows a flow chart to implement step 1012 of FIG. 12a for computing Read Size, the number of bytes to be read. In step 1031 Read Size is set equal to the Cluster Size minus the Cluster Offset. The Read Size must be less than or equal to the size of a cluster. In the first iteration of the read operation the Read Size may be smaller than a Cluster Size if there is a Cluster Offset. That is, if the data to be read from a disk begins in the middle of the cluster. On subsequent iterations through the read operation Read Size will be equal to the size of a cluster because the Cluster Offset will have been set to zero in step 1026. Step 1033 tests whether Read Size is greater than the Output Buffer Size. If the Read Size is not greater than the Output Buffer Size this indicates that the data remaining on the disk to be read to the Output Buffer is greater than or equal to the size of a cluster and Read Size remains at the size of a cluster. This step 1012 is then done at this point.

However, if Read Size is greater than the Output Buffer Size, this indicates that the end of the Output Buffer has been reached, and that the data remaining to be read is less than the size of a cluster. In that case, in step 1035 Read Size is set equal to the data remaining to be read, namely, the Output Buffer Size. Note that the Output Buffer Size changes as iterations are made through the read operation because the variable Output Buffer Size is decremented by Read Size in step 1016. After step 1035, step 1012 is done.

FIG. 12c is a flow chart for executing the read cluster operation that is step 1014 of FIG. 12a. In step 1051 a cluster of data associated with Cluster Index is read from the disk and stored in the Read Buffer. This step 1051 is explained more fully below with reference to FIG. 13. In step 1053 a cluster of data is copied from the Read Buffer into the Output Buffer. This step may be performed by copying data in the Read Buffer from Cluster Offset for Read Size number of bytes to the Output Buffer at the offset Output Buffer Offset. After this step, step 1014 is done.

Figure 13:
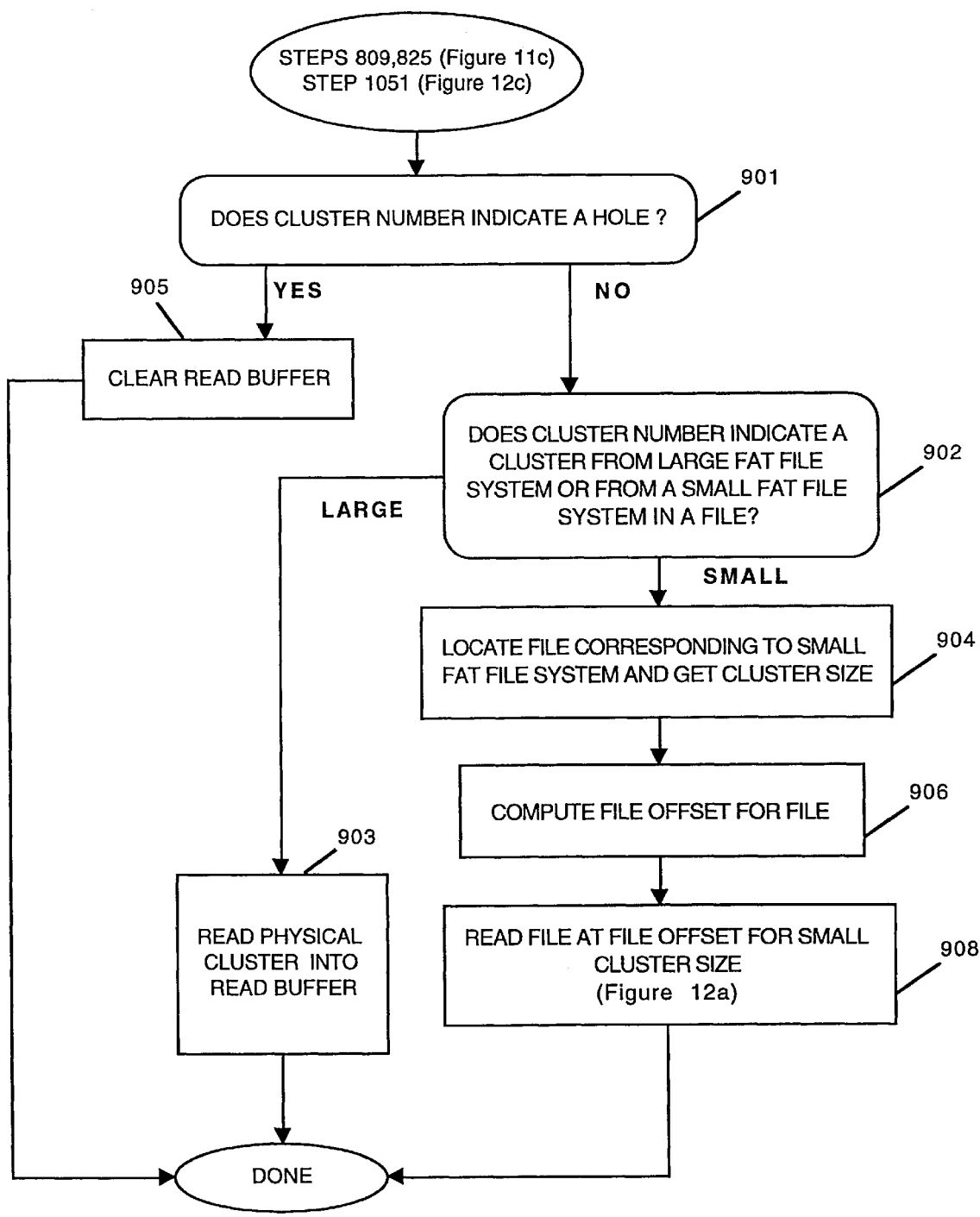
FIG. 13 is a flow chart representing a read operation for reading a cluster from disk into a read buffer that may be used in both the write and read operations in accordance with one embodiment of the present invention.

FIG. 13 is a flow chart for reading data represented in a file system and leaving this data in the Read Buffer. If the cluster of data is actually stored on disk it is read, but if the cluster is stored as a "hole" then the Read Buffer need only be cleared to zero. This flow chart corresponds to steps 809 and 825 of FIG. 11c and step 1051 of FIG. 12c. Step 901 determines if the Cluster Number for the cluster to be read indicates that the cluster is stored as a "hole". The file system may indicate that a cluster is stored as a "hole" if its Cluster Number used as an index into the FAT or FAT extension is greater than or equal to N, but less than N+M, using the example given in FIG. 5. If the cluster is represented as a "hole" then in step 905 the Read Buffer is cleared. If not, then it is first determined whether or not the cluster to be read is stored in the Large FAT file system or whether it is stored in one of the Small FAT file systems.

Step 902 determines whether the cluster number indicates the Large FAT file system or one of the Small FAT file systems. For example, a cluster number below N would indicate the Large FAT file system, while a higher cluster number would indicate one of the Small FAT file systems. If the Large FAT file system is indicated, then in step 903 the data is read from disk at that physical cluster number and stored in the Read Buffer and this flow chart is done. However, if a Small FAT file system is indicated in step 902, then in step 904 the file within the Large FAT file system that contains the appropriate Small FAT file system is located. This file may be located by referencing the directory of file allocation tables in FIG. 7. For example, if the cluster number is "N+M+P+2", by reference to the fourth row of this table, it may be determined that cluster number "N+M+P+2" is contained in the Small FAT file system C that is located in File C and that has a cluster size of 16 k. In this example for step 904, the procedure would locate the file "File C" and a cluster size of 16 k based upon a cluster number of "N+M+P+2". Now that the actual file has been located that contains the Small FAT file system, a read may be requested from this file in order to actually read the data from the disk.

Before the read is requested, a file offset must be calculated in order to determine exactly where within the file the data should be read from. In step 906 the File Offset is computed for the located file. This File Offset may be calculated by subtracting the beginning cluster number for that file (available from the directory of file allocation tables) from the cluster number and by multiplying by the cluster size for that Small FAT file system. Next, in step 908 the file containing the Small FAT file system is read from at the File Offset for an amount of data equal to the small cluster size. This read is preferably performed by recursively calling the read procedure of FIG. 12a and passing it these parameters. On this second iteration through the read procedure, the user data will be actually read from disk in step 903, which serves as a terminating condition for this recursive call. On the second iteration, a cluster number will be calculated for this file that is stored in the Large FAT file system and that will be read from. Thus, upon reaching step 902, the procedure will branch to step 903 and the procedure will end after the second iteration.

Figure 14A:
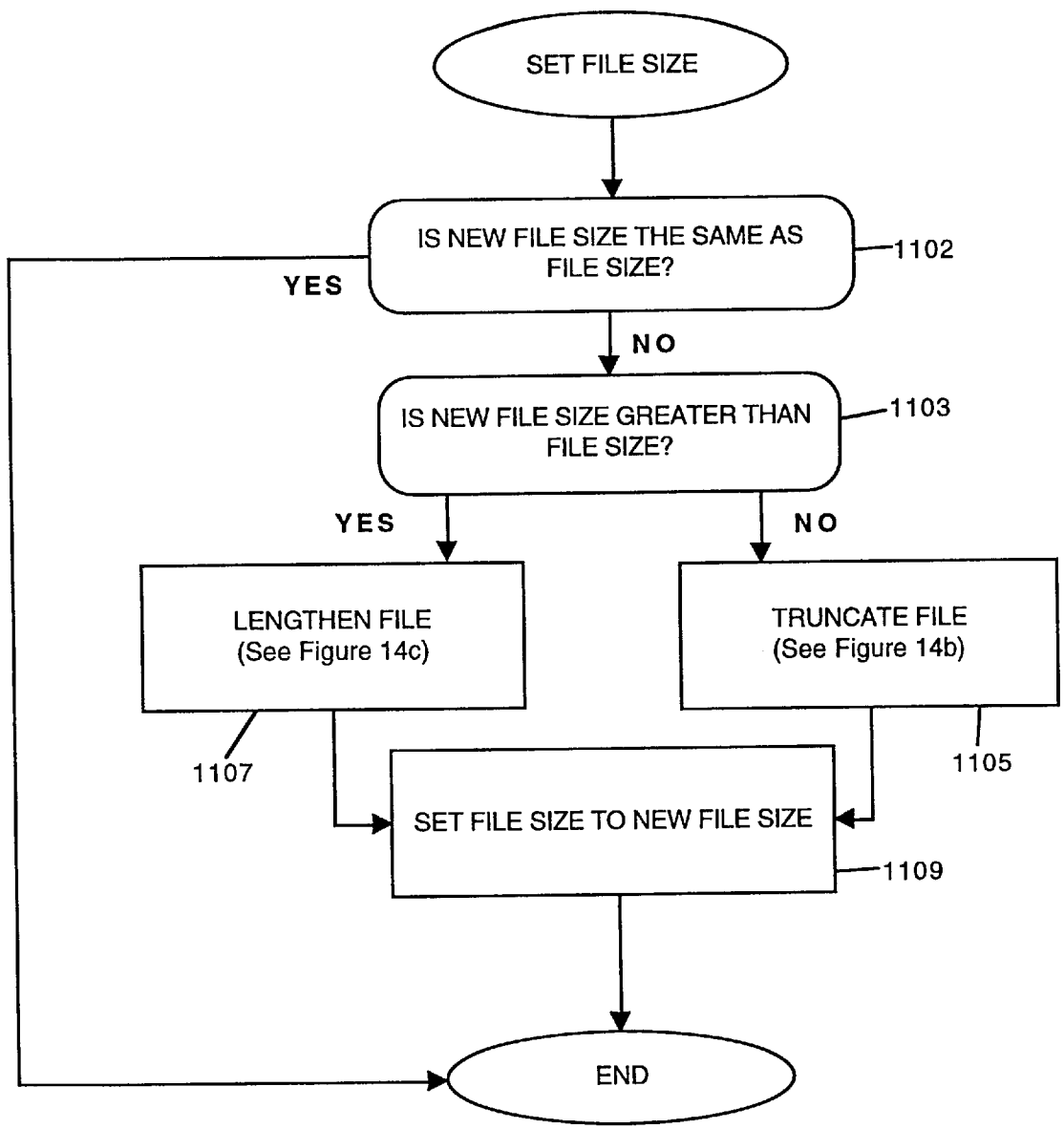
FIG. 14a is a flow chart representing a set file size operation in accordance with one embodiment of the present invention.

FIG. 14a is a flow chart for executing the set file size operation. The set file size operation is used by the file system to either decrease the size of a file on disk or to increase the size of a file on disk. It may also be used to reclaim space at the end of a file. By way of example, if a user is editing a file in the memory of the computer and decreases the size of that file, when that file is then written to disk the set file size operation may be used instead of the previously discussed write operation. The set file size operation may also be used to increase the size of a file. The result of the set file size operation is that the size of the file is changed from the old File Size to the New File Size that is input to the operation. The New File Size may be greater than, less than or equal to the old File Size. If the old File Size and New File Size are the same then no steps are performed. Otherwise the file is either lengthened or truncated.

The set file size operation begins by receiving as input the parameter New File Size that indicates in bytes the desired size of the new file and the parameter Open File Descriptor. In step 1102 the New File Size is compared to the current File Size. If both are the same then the set file size operation terminates. If they are not the same, then the New File Size is compared against the File Size in step 1103. If the New File Size is greater than File Size this indicates that the file must be lengthened and the lengthen file step 1107 is performed. This step will be explained in more detail below with reference to FIG. 14*c*. If New File Size is less than File Size this indicates that the file must be decreased in size and the truncate file step 1105 is performed. This step will be explained in more detail below with reference to FIG. 14*b*. In step 1109 the variable File Size is reset to New File Size. Next, the Meta data information for the file is updated and this Meta data is then written to disk; the set file size operation then terminates.

Figure 14B:
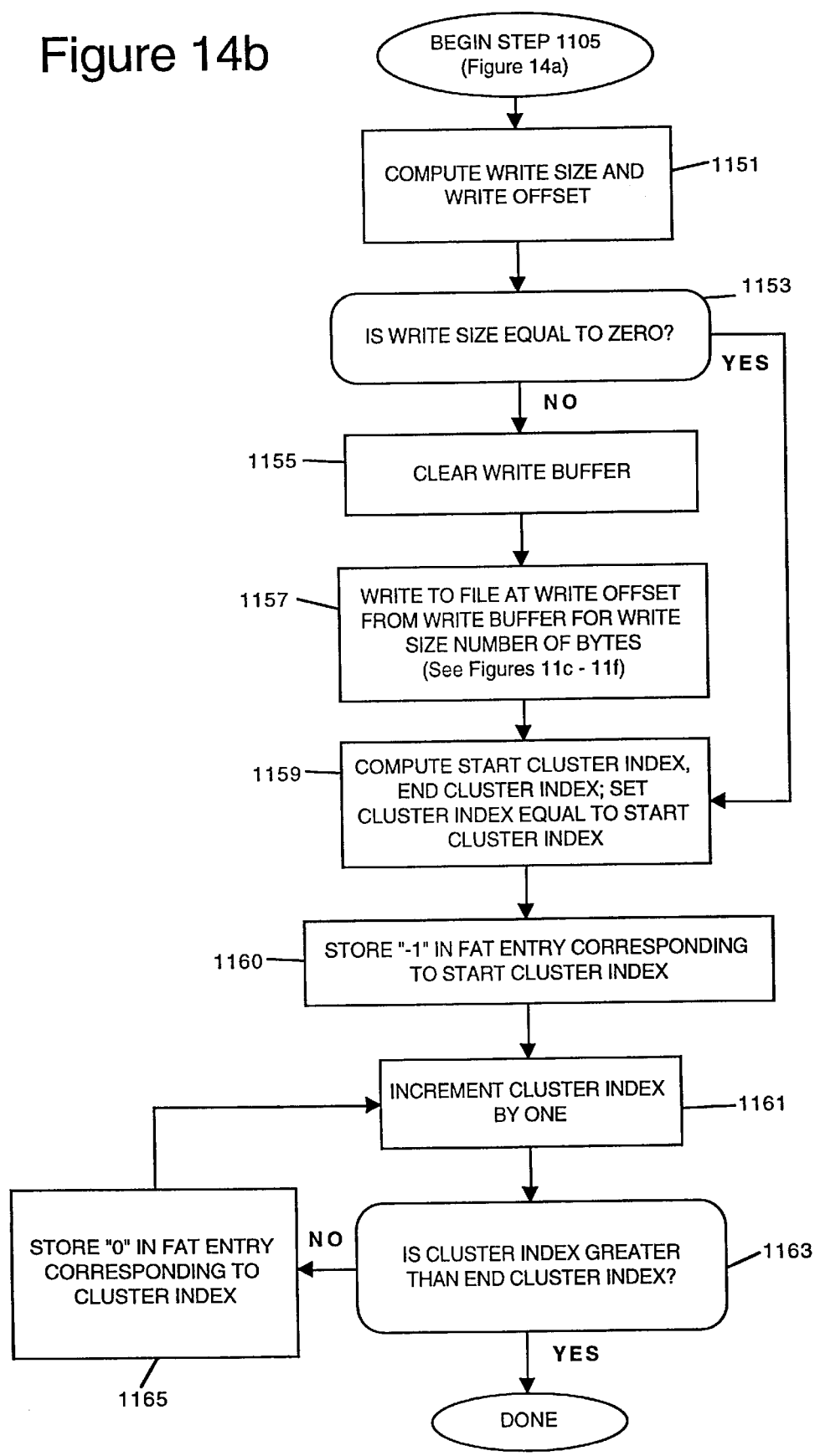

FIG. 14*b* is a flow chart for performing the truncate file step 1105 from FIG. 14*a*. The goal of the truncate file step is to zero out the bytes after the pointer New File Size to the end of the cluster. Then, any clusters after the cluster containing the offset New File Size are freed. In step 1151 the variables Write Size and Write Offset are computed. The variable Write Offset represents a pointer that indicates the location in the file from which the bytes must be zeroed out. The variable Write Offset is set equal to New File Size. The variable Write Size represents the number of remaining bytes at file offset New File Size up to the end of the cluster that must be zeroed out. The temporary variable Temporary Write Size is set equal to Cluster Size minus the remainder of New File Size divided by Cluster Size. Next, if New File Size equals zero or if Temporary Write Size equals Cluster Size then Write Size is set equal to zero. If not, Write Size is set equal to Temporary Write Size.

If Write Size equals zero then no bytes need to be zeroed out and clusters may be freed. In step 1153 if Write Size equals zero then control moves to step 1159, if not, then control moves to step 1155. In step 1155 the Write Buffer is cleared. The Write Buffer will have the size equal to Cluster Size. In step 1157 Write Size number of bytes will be written from the Write Buffer to the file starting at the Write Offset. Because this is a write operation, step 1157 may be implemented by using the write operation shown in FIGS. 11*c* to 11*f*. Four variables will be passed to this write operation. As described above, this write operation requires four inputs, namely, an Input Buffer, an Input Buffer Size, a File Offset and an Open File Descriptor. In step 1157 Write Buffer corresponds to Input Buffer, Write Size corresponds to Input Buffer Size, Write Offset corresponds to File Offset and the Open File Descriptor that identifies the current file that had been input to the set file size operation above is passed to the write operation.

Steps 1159 through 1165 represent the steps through which the remaining clusters after the cluster containing New File Size are freed up. In step 1159 the variables Start Cluster Index and End Cluster Index are computed. The Start Cluster Index is the quotient of the Write Offset divided by Cluster Size. The End Cluster Index is the quotient of File Size minus one, divided by Cluster Size. If, however, the Write Size is equal to zero, then Start Cluster Index should also be decremented by one after its value is computed. In step 1160 the last cluster of data for the file is indicated by storing a "−1" in the FAT entry that corresponds to the Start Cluster Index. The remaining clusters up to the cluster associated with End Cluster Index are no longer needed and will be freed by indicating in either the FAT or the FAT extension that the cluster is unallocated.

In step 1161 Cluster Index is incremented by one. In step 1163 Cluster Index is compared to End Cluster Index. If Cluster Index is greater than End Cluster Index then this step 1105 of FIG. 14*a* is done. If not, then this indicates that a cluster needs to be freed. In step 1165 a "0" is stored in the FAT entry corresponding to the Cluster Index to indicate that the cluster associated with this Cluster Index is now unallocated. For a physical cluster on disk, a "0" in its corresponding FAT entry indicates that the cluster is now free. For a "hole" cluster, a "0" in its corresponding FAT extension entry indicates that this entry in the FAT extension no longer represents a "hole" for the current file and may be used to indicate a "hole" for another file if needed. After step 1165 the loop continues to step 1161, Cluster Index is incremented by one to indicate the next cluster, and operation continues as described above.

Figure 14C:
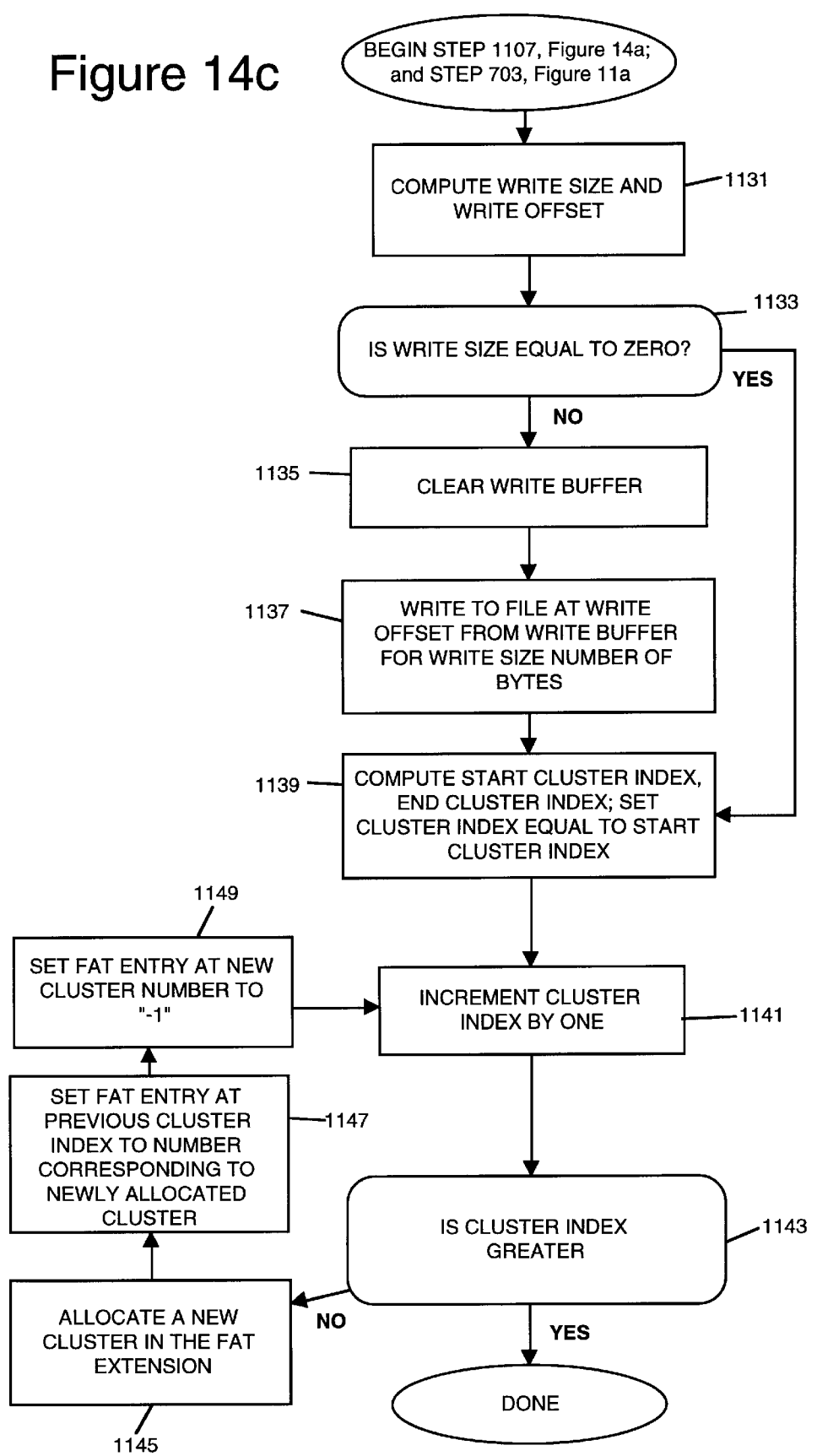

FIG. 14*c* shows step 1107 from FIG. 14*a* and step 703 from FIG. 11*a* each of which is the lengthen file step. The goal of this lengthen file step is to zero out all the bytes after the old File Size to the end of the cluster. Then, any clusters after the cluster containing the offset old File Size are marked as holes. In step 1131 the variables Write Size and Write Offset are computed. The variable Write Offset represents a pointer that indicates the location after the file from which the bytes must be zeroed out. The variable Write Offset is set equal to Old File Size. The variable Write Size represents the number of remaining bytes at file offset Old File Size up to the end of the cluster that must be zeroed out. Next, the temporary variable Temporary Write Size is set equal to Cluster Size minus the remainder of the Old File Size divided by Cluster Size. Next, if the File Size equals zero or if Temporary Write Size equals Cluster Size then Write Size is set equal to zero. Otherwise, Write Size is set equal to Temporary Write Size.

If Write Size equals zero then no bytes need to be zeroed out and clusters following may be marked as holes. In step 1133 if Write Size equals zero then control moves to step 1139, if not, then control moves to step 1135. In step 1135 the Write Buffer is cleared. The Write Buffer will have a size equal to Cluster Size. In step 1137 Write Size number of bytes will be written from the Write Buffer to the file starting at the Write Offset. Because this is a write operation, step 1137 may be implemented by using the write operation shown in FIGS. 11*c* to 11*f*. Four variables will be passed to this write operation. As described above, this write operation requires four inputs, namely, an Input Buffer, an Input Buffer Size, a File Offset and an Open File Descriptor. In step 1137 Write Buffer corresponds to the Input Buffer, Write Size corresponds to Input Buffer Size, Write Offset corresponds to File Offset and the Open File Descriptor that identifies the current file that had been input to the set file size operation above is also passed to the write operation. After the write operation is complete, control moves to step 1139.

Steps 1139 though 1149 perform the function of marking all the clusters after the cluster containing the variable old File Size as "holes". In step 1139 the variables Start Cluster Index and End Cluster Index are computed. The Start Cluster Index is the quotient of the Write Offset divided by Cluster Size. The End Cluster Index is the quotient of New File Size minus one, divided by Cluster Size. If, however, the Write Size is equal to zero, then Cluster Index should also be decremented by one after computing its value. In step 1141 Cluster Index is incremented by one. In step 1143 Cluster Index is compared to End Cluster Index. If Cluster Index is greater than End Cluster Index then this lengthen step is done. If not, more clusters need to be marked as "holes".

In step 1145 a new cluster is allocated in the FAT extension in order to represent a cluster as a "hole". This allocation may be done simply by identifying a FAT entry in the FAT extension that has a value of "0" indicating that this cluster has not been allocated as a "hole" yet. In step 1147 the linked list representing all of the clusters in the current file is updated to reflect that a new "hole" has been added to the file. The FAT entry that corresponds to the previous cluster index is set to the cluster number for the newly allocated cluster. In this fashion, the previous cluster now points to the new "hole" that has just been allocated. Next, in step 1149 the file must be terminated. Accordingly, the FAT entry corresponding to the new Cluster Number is set to a "−1" to indicate that this is the last cluster in the file. If more "holes" are added in subsequent steps 1141 through 1147 then this last cluster will have its FAT entry changed to point to a new last cluster. After step 1149 the loop continues to step 1141, Cluster Index is incremented by one indicating the next cluster, and operation continues as above.

An aspect of the present invention also relates to the compression of files and their representation in a file system. Data compression software may be implemented either at the sector level or at the file system level. Sector level compression schemes compress a disk's entire contents, including file system meta-data. They work between a file system and the disk driver, compressing data as they are written to the disk and automatically expanding the data when reading from the disk. Examples of products based upon both file and sector level compression are "Stacker" available from Stac Electronics™, and "DoubleSpace" and "DriveSpace" available from Microsoft™ Corporation. The book "PC Intern System Programming", Michael Tischer, Abacus/Data Becker, 5th edition, 1995 also describes the "DoubleSpace" product. The paper "On-line Data Compression in a Log-structured File System" by M. Burrows, C. Jerian, B. Lampson and T. Mann, Proceedings of the 5th International Conference on Architectural Support for Programming Languages and Operating Systems, 1992, describes file system level compression in general.

In this aspect of the present invention, the representation of "holes" in the FAT extension are used to represent files that have been compressed, thus allowing both compressed and expanded files on a disk to coexist. A method that utilizes "holes" within a file system in order to represent compressed files at the file system level without changing the underlying file system format is described in the patent application "File System Level Compression Using Holes" by inventors Madany, Wong and Nelson, filed on Mar. 27, 1996, Ser. No. 08/623,907 allowed and is hereby incorporated by reference in its entirety.

In this aspect of the invention, a compression unit is used to compress a file. The compression ratio (compressed output size divided by expanded input size) decreases when the input size increases. In this aspect of the invention, a file is divided into a set of fixed size compression units, where the size of each compression unit is a multiple of the cluster size. Preferably, a compression unit is at least four or more times the size of a cluster. For compression, an embodiment of the present invention system accumulates data until the amount of modified data reaches or exceeds the size of a compression unit. The data is then compressed and written back to the disk. When a user reads a compressed file at offset N, the FAT file system will retrieve the stored compression unit that contains the bytes at offset N. It then expands the data and returns them to the user.

If a compression unit having N clusters is compressed, and if the compression process successfully reduces the number of clusters needed to store the unit, then the FAT file system will store the unit using M clusters, where M<N. When the compressed data of a unit is written to the disk, the clusters (N−M) at the end of the compression unit that were compressed away are treated as "holes" and represented in the FAT extension. If the compression fails to reduce the number of clusters needed to store the data, then the compression unit will be stored in its expanded form.

In order to distinguish "holes" resulting from compressing a file from "holes" due to a file simply having a cluster full of zeros, in another aspect of the invention even numbered Cluster Numbers of a FAT extension are used to represent "holes" that are not the result of compression and odd numbered Cluster Numbers are used to represent "holes" that are the result of compression. Thus, in this aspect of the present invention, only one additional FAT extension would be needed to represent "holes" within the file system. This FAT extension may be used to represent compressed files with holes and also expanded files that have clusters that are zero. It is also contemplated that additional FAT extensions may be used to represent different compression algorithms used in the file system. For example, a first FAT extension may be used to represent only "holes" due to files that have zero clusters. Second and third FAT extensions may be implemented that would represent "holes" created by two different compression algorithms that are used in the file system. That is, files that have "holes" due to compression by the first compression algorithm would have these "holes" represented in the second FAT extension, and files that have "holes" due to compression by the second compression algorithm would have these "holes" represented in the third FAT extension. In this manner, the file system would know which compression algorithm should be used to expand a compression unit based upon from which FAT extension the "holes" came.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include machine code, such as produced by a compiler, and higher level code that can be executed by an interpreter.

Figure 15:
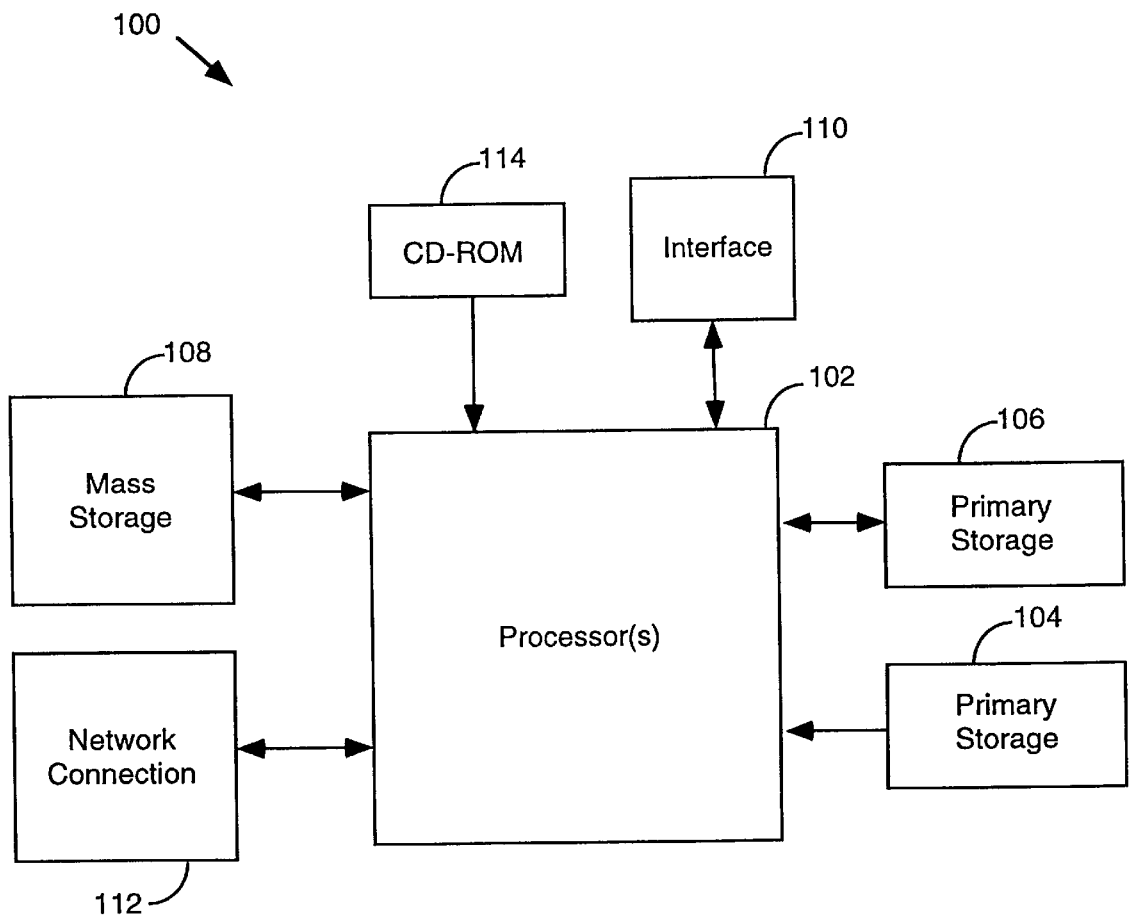
FIG. 15 illustrates a typical computer system suitable for implementing the present invention.

FIG. 15 illustrates a typical computer system in accordance with the present invention. The computer system 100 includes any number of processors 102 (also referred to as central processing units, or CPUs) that are coupled to storage devices including primary storage 106 (typically a random access memory, or RAM), and primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of understanding, it will be apparent that certain modifications may be practiced within the scope of the appended claims. For instance, any number of FAT extensions or Small FAT file systems may be present within the combined FAT file system. Also, one or more of the FAT extensions may be used to represent compressed files. Within a file that represents a Small FAT file system, the file allocation table for that file system may be represented at any cluster in that file, or elsewhere in the CFAT file system. In addition, the directory of file allocation tables may be implemented in other forms other than that shown. For example, the relationship between a range of clusters and a particular Small FAT file system may be expressed in other data structures. For example, the file directory may be modified to incorporate information from the directory of file allocation tables. Also, although the write and read procedures described are recursive, it is possible to utilize the concept of a CFAT file system by writing and reading in manners other than recursively. Furthermore, the read and write procedures described above implement one possible allocation strategy; other strategies for allocating clusters of a file to either a Large or Small FAT file system are possible. Therefore, the described embodiments should be taken as illustrative and not restrictive, and the invention should not be limited to the details given herein but should be defined by the following claims and their full scope of equivalents.

We claim:

1. A combined file allocation table file system (CFAT file system) embodied in a computer-readable medium, said CFAT file system being arranged for storing a first file having a plurality of data segments, said CFAT file system comprising:

a large file allocation table arranged to indicate the status of a plurality of large clusters, said large file allocation table being associated with a Large FAT file system;

a file allocation table extension arranged to indicate holes within said CFAT file system; and a small file allocation table arranged to indicate the status of a plurality of small clusters, said small clusters being of a different size than said large clusters, said small file allocation table being associated with a Small FAT file system, whereby said first file may be stored utilizing a combination of said large clusters indicated in said large file allocation table and said small clusters indicated in said small file allocation table.

2. A CFAT file system as recited in claim 1 further comprising a directory of file allocation tables, said directory being arranged to define the number of large clusters associated with the location of said Large FAT file system and to define the number of small clusters associated with the location of said Small FAT file system within said CFAT file system.

3. A CFAT file system as recited in claim 2 wherein said directory further includes a cluster size for each of said Large FAT file system and said Small FAT file system.

4. A CFAT file system as recited in claim 1 wherein said Small FAT file system is contained in a second file of said Large FAT file system.

5. A CFAT file system as recited in claim 4 wherein said small file allocation table is contained in said second file.

6. A CFAT file system as recited in claim 1 wherein said Small FAT file system is represented as a plurality of holes in said file allocation table extension until one of said small clusters of said Small FAT file system is allocated.

7. A CFAT file system as recited in claim 1 wherein said first file contains at least one hole represented in said file allocation table extension.

8. A CFAT file system as recited in claim 1 further comprising a plurality of Small FAT file systems, each Small FAT file system having a plurality of small clusters of the same size associated therewith, said Small FAT file systems providing a range of small cluster sizes and each having an associated small file allocation table.

9. A CFAT file system as recited in claim 1 further arranged for storing said first file to storage over a network connection, wherein said large file allocation table is further arranged to indicate the status of said large clusters within said storage, and wherein said small file allocation table is further arranged to indicate the status of said small clusters within said storage, whereby said first file is stored to said storage over said network connection.

10. A file allocation table (FAT) directory embodied in a computer-readable medium for storing a file to storage over a network connection, said FAT directory being arranged to assist in the implementation of a combined file allocation table file system (CFAT file system) having a Large FAT file system with a plurality of large clusters and a Small FAT file system with a plurality of small clusters of a size different from said large clusters, said FAT directory comprising:
 a large cluster range indicator arranged to indicate the number of large clusters available within said Large FAT file system;
 a hole range indicator arranged to indicate the number of holes available within a FAT extension, said FAT extension being contained within said CFAT file system;
 a small cluster range indicator arranged to indicate the number of small clusters available within said Small FAT file system; and
 a small system location indicator arranged to indicate the location within the CFAT file system of said Small FAT file system, said small system location indicator being associated with said small cluster range indicator, whereby said FAT directory may be utilized by said CFAT file system to store a file to storage over a network connection using one of said large clusters of said Large FAT file system and one of said small clusters of said Small FAT file system.

11. A FAT directory as recited in claim 10 further comprising:
 a large cluster size indicator associated with said Large FAT file system; and
 a small cluster size indicator associated with said Small FAT file system.

12. A FAT directory as recited in claim 10 wherein said small cluster range indicator indicates the number of small clusters available within a first file of said Large FAT file system, said first file including said Small FAT file system.

13. A FAT directory as recited in claim 10 further comprising:
 a large table location indicator being arranged to indicate the location within said CFAT file system of a file allocation table for said Large FAT file system; and
 an extension indicator being arranged to indicate the location within said CFAT file system of said FAT extension.

14. A FAT directory as recited in claim 10 wherein said CFAT file system further includes a plurality of Small FAT file systems, each Small FAT file system having a plurality of small clusters that provide a range of small cluster sizes, said FAT directory further comprising:

a plurality of small cluster range indicators, each being arranged to indicate the number of small clusters available within a corresponding one of said Small FAT file system; and
 a plurality of small system location indicators, each being arranged to indicate the location within the CFAT file system of a corresponding one of said Small FAT file system, each of said small system indicators associated with a corresponding one of said small cluster range indicators, whereby said FAT directory may be utilized by said CFAT file system to store a file to said storage over said network connection using one of said large clusters of said Large FAT file system and at least one small cluster from one of said Small FAT file systems.

15. A computer apparatus comprising:
 a processing unit;
 an input/output device coupled to said central processing unit;
 a storage device in communication with said central processing unit over a network connection; and
 a combined file allocation table file system (CFAT file system), said CFAT file system being arranged for storing a first file having a plurality of data segments to said storage device, said CFAT file system including
  a large file allocation table arranged to indicate the status of a plurality of large clusters within said storage device, said large file allocation table being associated with a Large FAT file system,
  a file allocation table extension arranged to indicate holes within said CFAT file system, and
  a small file allocation table arranged to indicate the status of a plurality of small clusters within said storage device, said small clusters being of a different size than said large clusters, said small file allocation table being associated with a Small FAT file system, whereby said first file may be stored in said storage device utilizing at least one of said large clusters indicated in said large file allocation table and at least one of said small clusters indicated in said small file allocation table.

16. A computer apparatus comprising:
 a processing unit;
 an input/output device coupled to said central processing unit;
 a storage device in communication with said central processing unit over a network connection; and
 a file allocation table (FAT) directory, said FAT directory being arranged to assist in the implementation of a combined file allocation table file system (CFAT file system) having a Large FAT file system with a plurality of large clusters and a Small FAT file system with a plurality of small clusters of a size different from said large clusters, said FAT directory including,
  a large cluster range indicator arranged to indicate the number of large clusters available within said Large FAT file system,
  a hole range indicator arranged to indicate the number of holes available within a FAT extension, said FAT extension being contained within said CFAT file system,
  a small cluster range indicator arranged to indicate the number of small clusters available within said Small FAT file system, and
  a small system location indicator arranged to indicate the location within the CFAT file system of said Small FAT file system, said small system location indicator being associated with said small cluster range indicator, whereby said FAT directory may be utilized by said CFAT file system to store a file in said storage device using one of said large clusters of said Large FAT file system and one of said small clusters of said Small FAT file system.

17. A computer-implemented method of storing data using a combined file allocation table file system (CFAT file system) having a large file allocation table arranged to indicate the status of a plurality of large clusters and a small file allocation table arranged to indicate the status of a plurality of small clusters, said small clusters being of a different size than said large clusters, said method comprising the steps of:

requesting that a first data segment of a first file be written;

storing said first said data segment of said first file using at least one of said large clusters indicated by said large file allocation table;

requesting that a second data segment of said first file be written;

determining whether said second data segment will fit within one of said small clusters indicated by said small file allocation table; and wherein when it is determined that said second data segment will fit within one of said small clusters, storing said second data segment using one of said small clusters indicated by said small file allocation table, whereby said first file is stored using a combination of at least one of said large clusters and at least one of said small clusters.

18. A method as recited in claim 17 wherein said plurality of large clusters are included within a Large FAT file system, said plurality of small clusters are included within a Small FAT file system, said Small FAT file system being contained in a second file of said Large FAT file system.

19. A method as recited in claim 18 wherein said step of storing said second data segment includes the sub-step of:

requesting that said second data segment be written to said second file of said Large FAT file system.

20. A method as recited in claim 17 wherein said step of determining whether said second data segment will fit within one of said small clusters is determined in part by reference to a directory of file allocation tables.

21. A method as recited in claim 17 further comprising the steps of:

determining whether said second data segment may be represented as a hole, wherein when it is determined that said second data segment may be represented as a hole, storing a hole indicator in a file allocation table extension indicating that said second data segment is a hole.

22. A method as recited in claim 17 for storing data to storage over a network connection, wherein said large file allocation table is further arranged to indicate the status of said large clusters within said storage, wherein said small file allocation table is further arranged to indicate the status of said small clusters within said storage, and wherein said steps of requesting and storing use said network connection to communicate with said storage, whereby said first file is stored in said storage over said network connection.

23. A computer-implemented method of retrieving data using a combined file allocation table file system (CFAT file system) having a large file allocation table arranged to indicate the status of a plurality of large clusters and a small file allocation table arranged to indicate the status of a plurality of small clusters, said small clusters being of a different size than said large clusters, said method comprising the steps of:

requesting that a first data segment of a first file be retrieved;

determining whether said first data segment is stored within one of said large clusters or within one of said small clusters;

wherein when it is determined that said first data segment is stored within one of said large clusters, the method further includes the step of reading said one of said large clusters into a buffer to retrieve said first data segment; and wherein when it is determined that said first data segment is stored within one of said small clusters, the method further includes the step of reading said one of said small clusters into a buffer to retrieve said first data segment, whereby said CFAT file system is arranged to store said first file using a combination of said large clusters and said small clusters.

24. A method as recited in claim 23 wherein the step of reading said one of said small clusters into a buffer includes the sub-steps of:

locating a second file containing said plurality of small clusters, and requesting that said first data segment be retrieved from said second file.

25. A method as recited in claim 23 wherein said plurality of large clusters are included within a Large FAT file system, said plurality of small clusters are included within a Small FAT file system, said Small FAT file system being contained in a second file of said Large FAT file system.

26. A method as recited in claim 23 wherein said step of determining whether said first data segment is stored within one of said large clusters or within one of said small clusters is determined by reference to a cluster number of said first data segment.

27. A method as recited in claim 26 wherein said cluster number of said first data segment is compared to cluster numbers in a directory of file allocation tables.

28. A method as recited in claim 23 further comprising the steps of:

determining whether said first data segment is represented as a hole;

wherein when it is determined that said first data segment is represented as a hole, said method further comprises the step of clearing a read buffer.

29. A method as recited in claim 23 for retreiving data from storage over a network connection, wherein said large file allocation table is further arranged to indicate the status of said large clusters within said storage, wherein said small file allocation table is further arranged to indicate the status of said small clusters within said storage, and wherein said steps of requesting, determining and reading use said network connection to communicate with said storage, whereby said CFAT file system is further arranged to store said first file in said storage accessible over said network connection.

30. A computer program product comprising a computer-usable medium having computer-readable program code embodied thereon for storing data using a combined file allocation table file system (CFAT file system) having a large file allocation table arranged to indicate the status of a plurality of large clusters and a small file allocation table arranged to indicate the status of a plurality of small clusters, said small clusters being of a different size than said large clusters, said computer program product comprising computer-readable program code for effecting the following steps within a computer system:

requesting that a first data segment of a first file be written;

storing said first said data segment of said first file using at least one of said large clusters indicated by said large file allocation table;

requesting that a second data segment of said first file be written;

determining whether said second data segment will fit within one of said small clusters indicated by said small file allocation table; and wherein when it is determined that said second data segment will fit within one of said small clusters, storing said second data segment using one of said small clusters indicated by said small file allocation table, whereby said first file is stored using a combination of said large clusters and said small clusters.

31. A computer program product as recited in claim 30 for storing data to storage over a network connection, wherein said large file allocation table is further arranged to indicate the status of said large clusters within said storage, wherein said small file allocation table is further arranged to indicate the status of said small clusters within said storage, and wherein said steps of requesting and storing use said network connection to communicate with said storage, whereby said first file is stored in said storage over said network connection.

32. A computer program product comprising a computer-usable medium having computer-readable program code embodied thereon for retrieving data using a combined file allocation table file system (CFAT file system) having a large file allocation table arranged to indicate the status of a plurality of large clusters and a small file allocation table arranged to indicate the status of a plurality of small clusters, said small clusters being of a different size than said large clusters, said computer program product comprising computer-readable program code for effecting the following steps within a computer system:

requesting that a first data segment of a first file be retrieved;

determining whether said first data segment is stored within one of said large clusters or within one of said small clusters;

wherein when it is determined that said first data segment is stored within one of said large clusters, the method further includes the step of reading said one of said large clusters into a buffer to retrieve said first data segment; and wherein when it is determined that said first data segment is stored within one of said small clusters, the method further includes the step of reading said one of said small clusters into a buffer to retrieve said first data segment, whereby said CFAT file system is arranged to store said first file using a combination of said large clusters and said small clusters.

33. A computer program product as recited in claim 32 for retreiving data from storage over a network connection, wherein said large file allocation table is further arranged to indicate the status of said large clusters within said storage, wherein said small file allocation table is further arranged to indicate the status of said small clusters within said storage, and wherein said steps of requesting, determining and reading use said network connection to communicate with said storage, whereby said CFAT file system is further arranged to store said first file in said storage accessible over said network connection.

34. A combined file allocation table file system (CFAT file system) embodied in a computer-readable medium, said CFAT file system being arranged for storing a first file having a plurality of data segments, said CFAT file system comprising:

a large file allocation table arranged to indicate the status of a plurality of large clusters, said large file allocation table being associated with a Large FAT file system;

a file allocation table extension arranged to indicate holes within said CFAT file system; and a small file allocation table arranged to indicate the status of a plurality of small clusters, said small clusters being of a different size than said large clusters, said small file allocation table being associated with a Small FAT file system, said small file allocation table and said Small FAT file system being contained in a second file of said Large FAT file system, whereby said first file may be stored utilizing a combination of said large clusters indicated in said large file allocation table and said small clusters indicated in said small file allocation table.

35. A CFAT file system as recited in claim 34 wherein said Small FAT file system is represented as a plurality of holes in said file allocation table extension until one of said small clusters of said Small FAT file system is allocated.

36. A CFAT file system as recited in claim 34 further arranged for storing said first file to storage over a network connection, wherein said large file allocation table is further arranged to indicate the status of said large clusters within said storage, and wherein said small file allocation table is further arranged to indicate the status of said small clusters within said storage, whereby said first file is stored to said storage over said network connection.

* * * * *